United States Patent
Kawasaki et al.

(10) Patent No.: US 8,542,996 B2
(45) Date of Patent: Sep. 24, 2013

(54) OPTICAL PACKET SWITCHING APPARATUS

(75) Inventors: Wataru Kawasaki, Kawasaki (JP);
Shota Mori, Kawasaki (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 283 days.

(21) Appl. No.: 13/042,372

(22) Filed: Mar. 7, 2011

(65) Prior Publication Data
US 2012/0128352 A1 May 24, 2012

(30) Foreign Application Priority Data

Nov. 24, 2010 (JP) ................................ 2010-261151

(51) Int. Cl.
*H04J 14/00* (2006.01)
(52) U.S. Cl.
USPC ............................................. 398/54; 398/52
(58) Field of Classification Search
USPC ..................................... 398/54, 52
See application file for complete search history.

(56) References Cited

U.S. PATENT DOCUMENTS

| 5,912,753 | A * | 6/1999 | Cotter et al. | 398/54 |
| 2011/0081149 | A1* | 4/2011 | Wada et al. | 398/54 |
| 2012/0163815 | A1* | 6/2012 | Mori et al. | 398/51 |
| 2012/0328284 | A1* | 12/2012 | Kawasaki | 398/25 |

FOREIGN PATENT DOCUMENTS

| JP | 2004-354612 | 12/2004 |
| JP | 2008-306555 | 12/2008 |

* cited by examiner

*Primary Examiner* — Nathan Curs
(74) *Attorney, Agent, or Firm* — Christie, Parker & Hale, LLP

(57) ABSTRACT

An optical packet switching apparatus includes an optical coupler, an optical switch unit, and an optical switch control unit. The optical switch control unit includes an optical-to-electrical converter, a serial/parallel converter, an arrangement detector, a rearrangement unit, a frame synchronization unit, a route detector, a control signal generator, and an adjustment unit for adjusting the timing with which to output an optical switch control signal to the optical switch unit, based on arrangement information on a frame synchronization pattern fed from the arrangement detector.

15 Claims, 17 Drawing Sheets

OPTICAL PACKET SWITCHING APPARATUS

CROSS-REFERENCE TO RELATED APPLICATION(S)

This application claims priority to and the benefit of Japanese Patent Application Number 2010-261151, filed on On Nov. 24, 2010.

BACKGROUND OF THE INVENTION

1. Field of the Invention

The present invention relates to an optical packet switching apparatus capable of exchanging packets per optical packet by switching an optical switch according to routing information given to an optical packet signal.

2. Description of the Related Art

In optical transmission systems employing wavelength division multiplexing (WDM), a technique that performs the path switching per wavelength by the use of a wavelength selective switch (WSS) and the like is put to practical use. As a technology that may succeed this technique, an optical packet switching method is now being investigated. In this optical packet switching method, an IP packet (10 GEther (10 Gigabit Ethernet (registered trademark) signal and the like), for example, is used as a small unit with which the switching is performed, and each is converted into the form of an optical packet and then the route is switched by an ultrahigh-speed optical packet switching apparatus. There is a possibility that the optical packet switching method can dramatically raise the bandwidth usage efficiency on the transmission path, and therefore it is regarded as a promising future technology. In the conventional practice, optical packet switching apparatuses used in the optical packet switching method disclosed in Reference (1) and Reference (2) in the following Related Art List are known, for instance.

RELATED ART LIST (1) Japanese Unexamined Patent Application Publication No. 2004-354612.
(2) Japanese Unexamined Patent Application Publication No. 2008-306555.

If, in the optical packet switching apparatus, it is possible to turn on the optical switching when a first bit of the received optical signals passes and it is possible to turn off the optical switch when the last bit thereof passes, the interval between the optical packets (hereinafter this interval will be referred to as "guard time") can be shortened and thereby the bandwidth usage efficiency of transmission path can be raised.

However, the received optical packet signal and the operation clock in a control circuit of the optical packet switching apparatus are not synchronous to each other. Thus, it is difficult to perform the above-described switching control in an actual setting, and the optical switch is usually turned on for a time length longer than the actual transit time of the optical packet signal. As the time length during which the optical switch is turned on becomes longer, the length of guard time must be set longer accordingly and therefore the bandwidth usage efficiency of the transmission path drops. Note here that this time length is hereinafter referred to as "optical switch on-time" also, as appropriate).

SUMMARY OF THE INVENTION

The present invention has been made in view of these circumstances, and a purpose thereof is to provide an optical packet switching apparatus capable of improving the bandwidth usage efficiency of the transmission path.

In order to resolve the above-described problems, an optical packet switching apparatus according to one embodiment of the present invention comprises: a branching unit configured to branch off a received optical packet signal; an optical switch unit configured to switch a route of one of the branched-off optical packet signal so as to output the optical packet signal; and an optical switch control unit configured to extract routing information from the other of the branched-off optical packet signal and configured to control the optical switching unit according to the extracted routing information. The optical switch control unit includes: an optical-to-electrical (O/E) converter configured to performs a serial/parallel conversion of the other optical packet signal into an electrical data signal and configured to extract a clock signal from the electrical data signal; a serial/parallel converter configured to convert the data signal into a parallel data signal and configured to divide the frequency of the clock signal so as to generate a divided clock signal; an arrangement detector configured to detect an arrangement of a frame synchronization pattern contained in the parallel data; a rearrangement unit configured to rearrange the parallel data signal based on detected arrangement information on the frame synchronizing pattern; a frame synchronization unit configured to establish frame synchronization based on the frame synchronization pattern contained in the rearranged parallel data signal; a route detector configured to detect the routing information contained in the parallel data signal after the frame synchronization has been established; a generator configured to generate an optical switch control signal used to control the optical switch unit based on the detected routing information; and an adjustment unit configured to adjust output timing with which to output the optical switch control signal to the optical switch unit, based on the arrangement information on the frame synchronization pattern.

By employing this embodiment, the optical switch control signal can be outputted to the optical switch unit with a suitable timing, according to the phase relationship between the received optical packet signal and the divided clock signal. As a result, the on-time of an optical switch can be shortened and a guard time can be reduced. Hence, the bandwidth usage efficiency of the transmission path can be improved.

Another embodiment of the present invention relates also to an optical packet switching apparatus. This apparatus comprises: a branching unit configured to branch off a received optical packet signal; an optical switch unit configured to switch a route of one of the branched-off optical packet signal so as to output the optical packet signal; and an optical switch control unit configured to extract routing information from the other of the branched-off optical packet signal and configured to control the optical switching unit according to the extracted routing information. The optical switch control unit includes: an optical-to-electrical (O/E) converter configured to performs a serial/parallel conversion of the other optical packet signal into an electrical data signal and configured to extract a clock signal from the electrical data signal; a serial/parallel converter configured to convert the data signal into a parallel data signal and configured to divide the frequency of the clock signal so as to generate a divided clock signal; a local oscillator configured to oscillate a local clock signal; a clock transfer unit configured to perform a transfer from the parallel data signal synchronized with the divided clock signal, to the local clock signal; a route detector configured to detect the routing information contained in the parallel data signal; a generator configured to generate an optical switch control signal used to control the optical switch unit, based on the detected routing information; a phase difference detector configured to detect a phase difference between the divided clock signal and the local clock signal; and an adjustment unit configured to adjust output timing of the optical switch control signal, based on information on the phase difference fed from the phase difference detector.

By employing this embodiment, the optical switch control signal can be outputted to the optical switch unit with a suitable timing, according to the phase relationship between the divided clock signal extracted from the received optical packet signal and the local clock signal. As a result, the on-time of an optical switch can be shortened and the guard time can be reduced. Hence, the bandwidth usage efficiency of the transmission path can be improved.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Hereinbelow, optical packet switching apparatuses according to preferred embodiment of the present invention are explained referring to drawings. The optical packet switching apparatuses according to the present embodiments enable route switching for each of optical packets. Route switching done for each optical packet improves the bandwidth usage efficiency of the transmission path. Firstly, before explaining the optical packet switching apparatuses according to the present embodiments, a description is given of a known optical packet switching apparatus which the inventor has examined as a comparative example.

Figure 1:
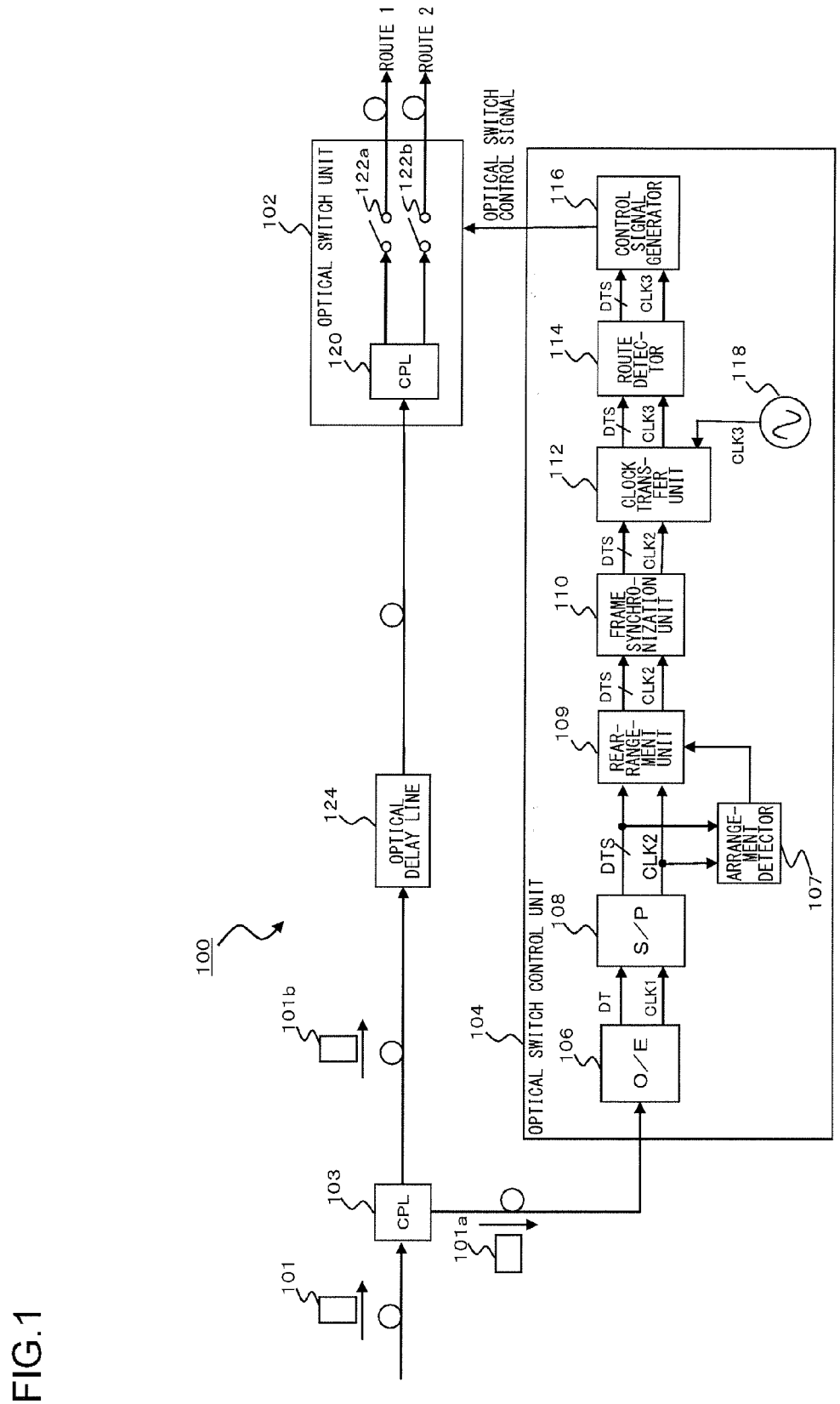
FIG. 1 is a diagram for explaining an optical packet switching apparatus which is depicted as a comparative example.

FIG. 1 is a diagram for explaining an optical packet switching apparatus 100 which is depicted as a comparative example. As shown in FIG. 1, the optical packet switching apparatus 100 according to the comparative example includes an optical coupler 103, an optical switch unit 102, and an optical switch control unit 104. An optical packet signal 101 inputted to the optical packet switching apparatus 100 via a transmission path is bifurcated into two signals by an optical coupler 103. An optical packet signal 101a, which is one of the bifurcated signals, is inputted to the optical switch control unit 104, whereas an optical packet signal 101b, which is the other of the bifurcated signals, is inputted to the optical switch unit 102.

Figure 2:
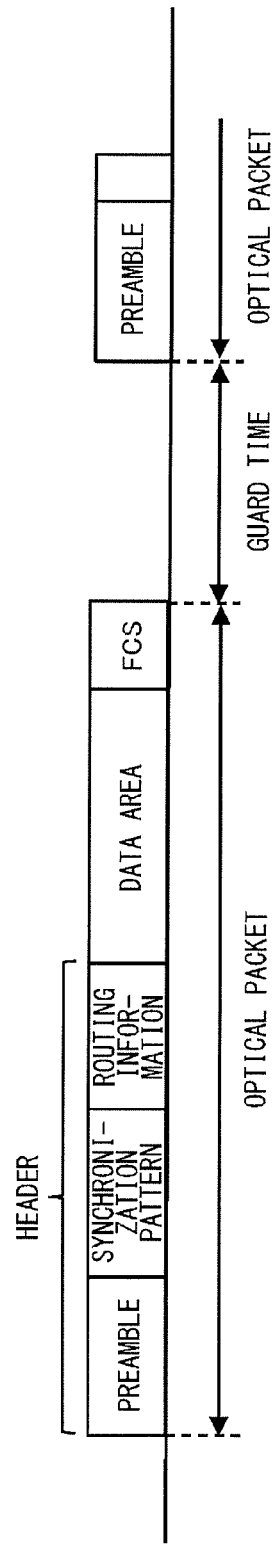
FIG. 2 shows a structure of an optical packet signal.

FIG. 2 shows a structure of an optical packet signal. As shown in FIG. 2, the optical packet signal is comprised of a data area, which is a user area, a header provided before the data area, an error detecting FCS (frame check sequence). The header has a preamble used to stabilize an optical receiver that receives optical packet signals, a frame synchronization pattern used in frame synchronization, and information on route (destination) of the optical packet signal. The preamble and the frame synchronization pattern each has a fixed value. The optical packet signal may be an optical packet signal of 10 GEther, for instance.

In an optical packet switching method, a no-signal interval called "guard time" is provided between adjacent optical packets, as shown in FIG. 2. The shorter the guard time is, the higher the bandwidth usage efficiency becomes. Thus, the degree to which this guard time can be reduced is a very important factor in determining the performance measure of the optical packet switching apparatus 100.

The optical switch control unit 104 extracts routing information from the optical packet signal 101a and outputs a control signal to the optical switch unit 102 according to the routing information. As shown in FIG. 1, the optical switch control unit 104 includes an optical-to-electrical (O/E) converter 106, a serial/parallel converter 108, an arrangement detector 107, a rearrangement unit 109, a frame synchronization unit 110, a clock transfer unit 112, a route detector 114, a control signal generator 116, and a local oscillator 118.

The O/E converter 106 performs predetermined processings, such as photoelectric conversion, amplification, clock extraction and identification and reproduction, on the received optical packet signal 101a and then outputs a data signal DT and a clock signal CLK1 to the serial/parallel converter 108.

The serial/parallel converter 108 performs serial/parallel conversion on the data signal DT so as to output a parallel data signal DTS and, at the same time, divides the frequency of the clock signal CLK1 and outputs a frequency-divided clock signal CLK2. If header analysis processing is carried out at the same signal speed as a high-speed optical signal of 10 Gbps or the like, the load on electric circuitry will be large. Thus, in terms of power consumption, the scale of LSI and so forth, it is desirable to carry out the header analysis processing after the signal speed has been lowered by the serial/parallel conversion.

In this comparative example, the serial/parallel converter 108 performs a serial/parallel conversion of 1:8. If, for example, the serial data signal DT of 10 Gbps and the clock signal CLK1 of 10 GHz are inputted to the serial/parallel converter 108, the parallel data signals DTS of 1.25 Gps×8 and the frequency-divided clock signal CLK2 of 1.25 GHz will be outputted from the serial/parallel converter 108.

The parallel data signal DTS and the frequency-divided clock signal CLK2 outputted from the serial/parallel converter 108 are inputted to the rearrangement unit 109. The parallel data signal DTS and the frequency-divided clock signal CLK2 are also inputted to the arrangement detector 107. Through its detail will be described later, there may be cases where the frame synchronization patterns contained in the parallel data signal DTS are arranged in phase with the clock and are arranged lying over two clocks, depending on the phase relationship between the serial data DT and the frequency-divided clock signal CLK2 at the time the serial/parallel conversion is performed at the serial/parallel converter 108. The arrangement detector 107 detects how the frame synchronization patterns contained in the parallel data signal DTS are arranged. Then, based on arrangement information fed from the arrangement detector 107, the rearrangement unit 109 rearranges the parallel data signal DTS so that the frame synchronization patterns are arranged in phase with the clock.

The parallel data signal DTS rearranged by the rearrangement unit 109 and the frequency-divided clock signal CLK2 are inputted to the frame synchronization unit 110. The frame synchronization unit 110 establishes the frame synchronization of the optical packet signals by detecting a predetermined frame synchronization pattern.

The parallel data signal DTS and the frequency-divided clock signal CLK2 whose frame synchronization is established are inputted to the clock transfer unit 112. The clock transfer unit 112 performs a transfer from the parallel data signal DTS synchronized with the frequency-divided clock signal CLK2 to a local clock signal CLK3 outputted by the local oscillator 118. The clock transfer unit 112 may be configured using an FIFO (first-in first-out) circuit and the like.

The parallel data signal DTS and the local clock signal CLK3 outputted from the clock transfer unit 112 are inputted to the route detector 114. The route detector 114 detects the routing information from the received parallel data signal DTS.

The control signal generator 116 generates an optical switch control signal used to control the turning on and off of an optical switch in the optical switch unit 102 according to the routing information detected by the route detector 114.

On the other hand, the optical packet signal 101b, which is the other of the bifurcated signals, is inputted to the optical switch unit 102 after passing through an optical delay line 124. If the optical packet signal 101b, which is branched off by the optical coupler 103, is inputted directly to the optical switch unit 102, the optical switch control signal outputted from the optical switch control unit 104 will not be in time for the timing at which the optical packet signal 101b arrives at the optical switch unit 102. As a result, the optical packet signal 101b cannot pass through the optical switch unit 102. Thus, the optical delay line 124 is provided between the optical coupler 103 and the optical switch unit 102 to eliminate the delay of the optical switch control signal in relation to the optical packet signal 101b. The optical delay line 124 can adjust the delay time by adjusting the optical fiber length.

The optical switch unit 102 is a 1×2 optical switch which has an optical coupler 120 for branching the inputted optical packet signal 101b off into two optical packet signals and a first optical switch 122a and a second optical switch 122b for receiving the branched-off optical packet signals. The first optical switch 122a and the second optical switch 122b may be implemented as ones employing a semiconductor optical amplifier (SOA) or an LN intensity modulator. The on/off of the first optical switch 122a and the second optical switch 122b is controlled by the optical switch control signal. For example, when the optical packet signal 101b is to be outputted to route 1, the first optical switch 122a is turned on (opened), and the second optical switch 122b turned off (closed). As a result, the optical packet signal 101b is outputted to route 1, passing through the optical switch 122a only.

Figure 3:
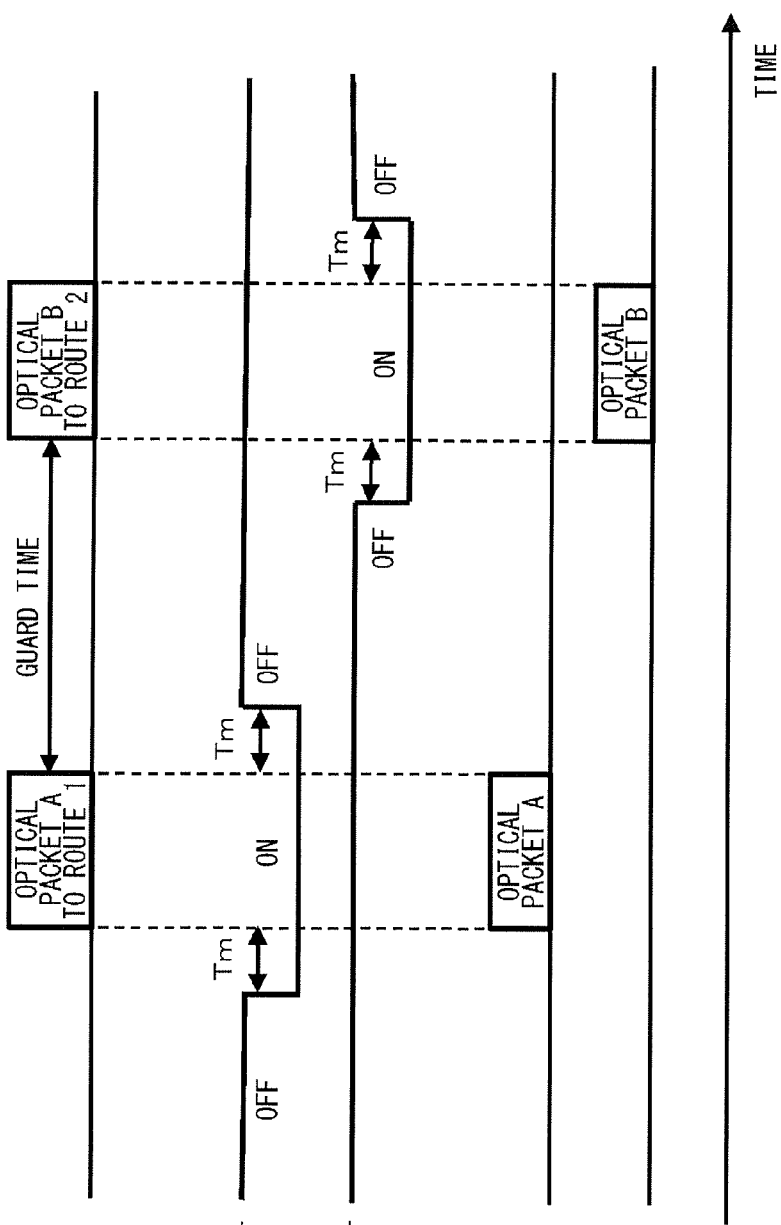
FIGS. 3A to 3C are timing charts showing of operations of an optical packet switching apparatus.

FIGS. 3A to 3C are timing charts showing operations of the optical packet switching apparatus. FIG. 3A is a timing chart of an optical packet signal inputted to the optical switch unit 102. FIG. 3B is a timing chart of an optical switch control signal outputted from the control signal generator 116. FIG. 3C is a timing chart of an optical packet signal outputted from the optical switch unit 102. As shown in FIG. 3A, consider that following case. That is, an packet A having information on route 1 is first inputted to the optical switch unit 102 and then an optical packet B having routing information on route 2 is inputted thereto after a predetermined guard time. Normally, the first optical switch 122a and the second optical switch 122b are each in an off state. A control signal, by which the first optical switch 122a is turned on, is outputted in time with the arrival of the optical packet signal A at the optical switch unit 102. Also, a control signal by which to turn on the second optical switch 122b is outputted in time with the passage of the optical packet signal B at the second optical switch 122b. Thereby, as shown in FIG. 3C, the optical packet A is outputted toward the route 1, whereas the optical packet B is outputted toward the route 2. Assume here, as shown in FIG. 3B, that each optical switch in the optical switch unit 102 is turned on for a longer period of time than the actual transit time of the optical packet. This is because, as will be discussed later, there are variations in the timing, with which the optical switch control signal is outputted, due to a phase relationship between the received optical packet signal and the operation clock signal in the optical switch control unit 104. Now, when the actual transit time of the optical packet is subtracted from the optical switch on-time, this resulting time duration, which is additionally and redundantly added to the actual transit time thereof and during which the optical switch is turned on, is herein called a "timing margin Tm".

The transition time of on/off of the optical switch is slower than the clock signal CLK1 extracted from the optical packet signal. Since each optical signal is composed of 100 bits to several 100,000 bits, the time length during which the on-state of the optical switch is continued becomes longer accordingly. For these reasons, the operating frequency of the optical switch control signal is lower than the frequency of the clock signal CLK1. Thus, in terms of reduction of circuit scale and power consumption, it is desirable that the optical switch unit 102 be controlled by a frequency-divided clock signal CLK2.

The data signal DT, obtained after the optical packet signal has been subjected to O/E conversion, has changing points (rising edges or falling edges) at speed of the clock signal CLK1. In contrast to this, since the optical switch control signal operates in synchronism with a low-speed clock equivalent to the frequency-divided clock signal CLK2, the optical switch control signal has less changing points, equivalent to those of the frequency-divided clock signal CLK2, than the data signal DT. If an optical switch is switched such that the optical switch can be turned on when the first bit of the received packet passes and turned off when the last bit passes, then the resource of the switch can be effectively utilized to its maximum degree. However, when the number of changing points drops and therefore the resolution of time which can be set as the operation of the optical switch gets coarser, the optical switch needs to be turned on for a period of time longer than the actual optical packet presence time. This forces the guard time to be longer by as much as the extra optical switch on-time.

FIGS. 4A to 4D are diagrams for explaining variations in delay time in establishing the frame synchronization. A description is given herein of an example where a serial data DT (e.g., 10 GBps) is serial/parallel converted into eight parallel data signals DTS (e.g., 1.25 Gbs×8 in parallel).

Figure 4:
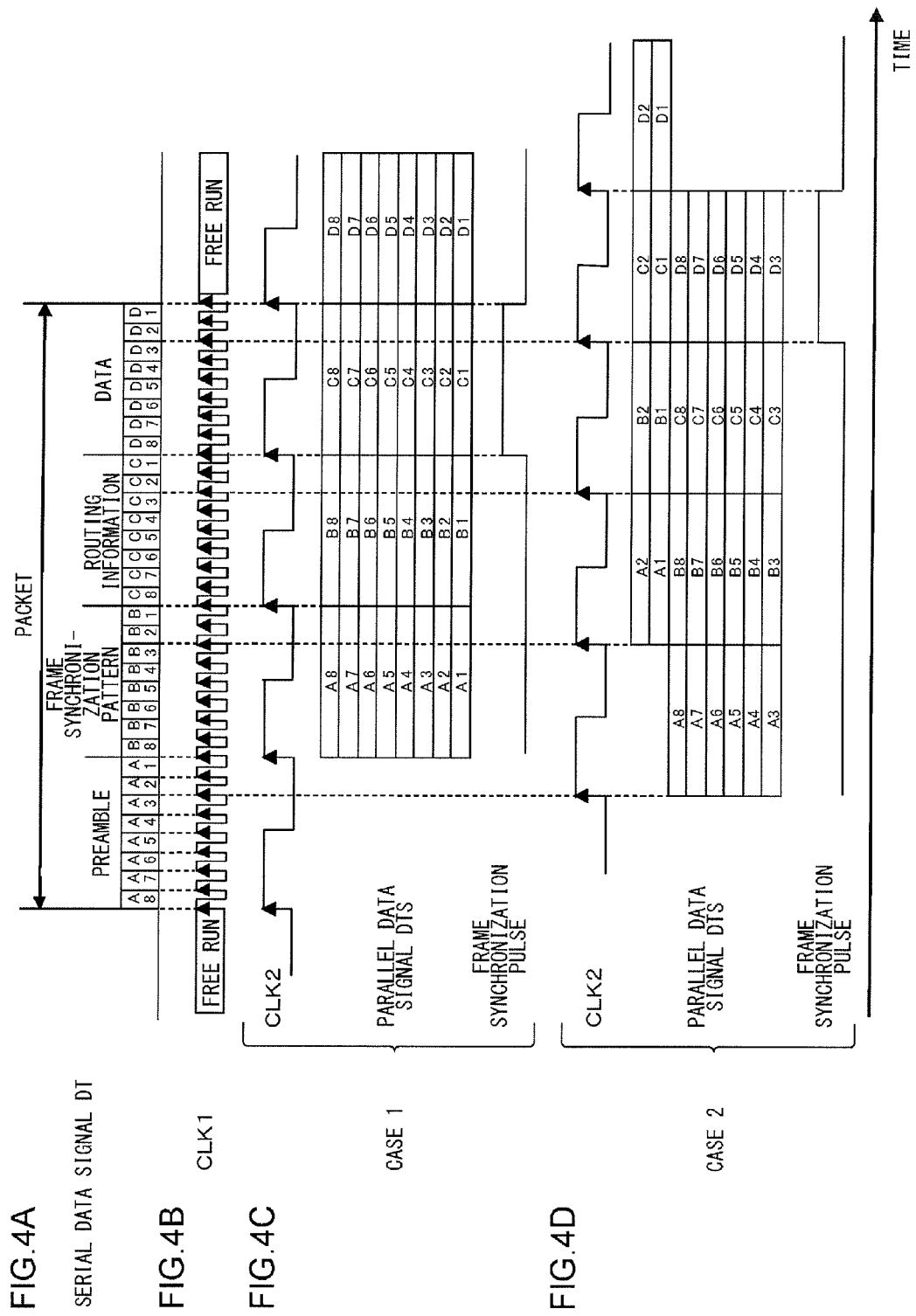
FIGS. 4A to 4D are diagrams for explaining variations in delay time in establishing the frame synchronization.

FIG. 4A shows serial data signals DT into which an optical packet signal has been optical-to-electrical (O/E) converted. FIG. 4B shows a clock signal CLK1 extracted from the serial signal. As shown in FIG. 4B, the clock signal CLK1 is stably extracted while there is the serial data signal DT, but the frequency and the phase thereof are in a free-run state while there is no serial data signal DT. Since the low-speed frequency-divided clock signal CLK2 is generated by dividing the frequency of the clock signal CLK1 in the serial/parallel converter 108, the clock signal CLK2 is synchronized with the clock signal CLK1 during the presence of the serial data signal DT. However, while there is no serial data signal DT, the frequency-divided clock signal CLK2 is also in a free-run state where the frequency and the phase thereof are unstable. If the next optical packet signal arrives when the frequency-divided clock signal CLK2 is in a free-run state, the frequency-divided clock signal CLK2 will be synchronized with the clock signal CLK1 extracted from the serial data signal DT. However, the phase relationship between the frequency-divided clock signal CLK2, which has been free-run, and the then arrived optical packet signal is not constant. Thus, how the frame synchronization patterns contained in the parallel data signal DTS will be arranged is not determined. For these reasons, two cases (case 1 and case 2) may occur as follows. Case 1: as shown in FIG. 4C, the frame synchronization patterns are arranged in phase with one another. Case 2: as shown in FIG. 4D, the frame synchronization patterns are arranged lying over two clocks. Since, in the frame synchronization unit 110, a frame synchronization pulse is outputted when all of the frame synchronization patterns are detected, there occurs a variation equivalent to one clock in the timing of establishment of frame synchronization. Such a variation in establishing the frame synchronization may lead to a variation in the output timing of the optical switch control signal.

Figure 5:
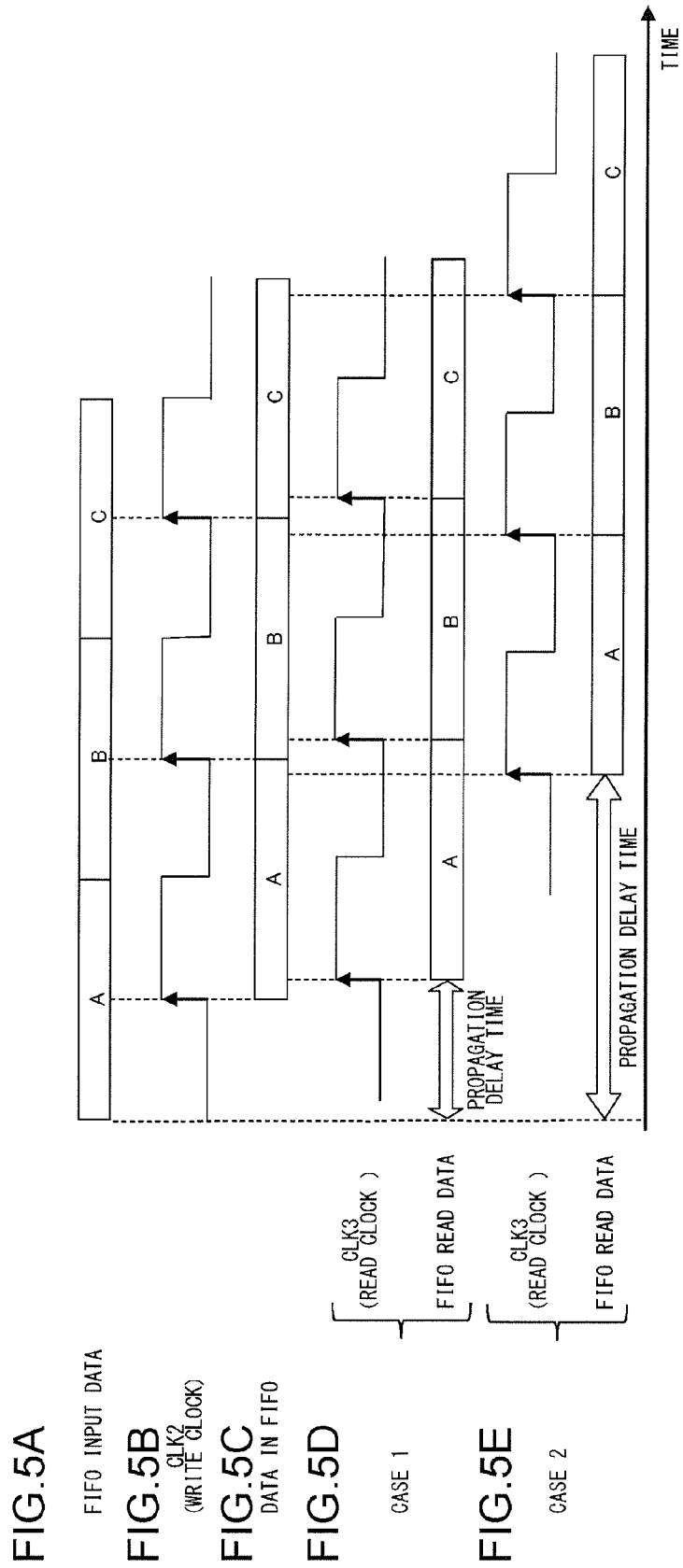
FIGS. 5A to 5E are diagrams for explaining variations in propagation delay time in a clock transfer unit.

FIG. 5A to 5E are diagrams for explaining variations in propagation delay time in the clock transfer unit 112. Optical packet signals may arrive at the optical packet switching apparatus from a large number of optical packet generating stations, and the clocks of these optical packet signals are asynchronous with each other. Moreover, even the optical packets coming from the same packet generating station differ in their optical fiber transmission delay times if the routes that they pass through are different; therefore the phase differences will also occur. Hence, it needs to be assumed that all optical packet signals are asynchronous with one another. Since the optical packets are mutually asynchronous and the frequency-divided clock signal CLK2 is in a free-run state while there is no packets, a transfer needs to be performed from the clock signal to the stable local clock signal CLK3 independently of whether there is a packet signal or not, in order to control the open/close of the optical switch unit 102. A clock transfer circuit such as a FIFO circuit is used to perform this transfer of the clock FIG. 5A shows input data inputted to the FIFO circuit. FIG. 5B shows a frequency-divided clock signal CLK2 which is a write clock of the FIFO circuit. FIG. 5C shows data, in the FIFO, written to the FIFO circuit in synchronization with the frequency-divided clock signal CLK2. In the FIFO circuit, the data in the FIFO is read out using the local clock signal CLK3 as a read clock. Since the frequency-divided clock signal CLK2 and the local clock signal CLK3 are asynchronous with each other, the output timing of readout data of the FIFO circuit varies depending on the phase relationship between the frequency-divided clock signal CLK2 and the local clock signal CLK3. FIG. 5D shows readout data of the FIFO circuit where the local clock signal CLK3 keeps a certain phase relationship to the frequency-divided clock signal CLK2 (Case 1). FIG. 5E readout data of the FIFO circuit where the local clock signal CLK3 keeps another phase relationship to the frequency-divided clock signal CLK2 (Case 2).

The propagation delay time of the FIFO circuit is a length of time starting from the input of data to the FIFO circuit until the data is read out from the FIFO circuit. It is evident from FIG. 5D and FIG. 5E that there occurs a variation in the propagation delay time of the FIFO circuit depending on the phase relationship between the frequency-divided clock signal CLK2 and the local clock signal CLK3. The width (range) of this variation is equivalent to a maximum of one clock pulse of the frequency-divided clock signal CLK2. Such a variation in the propagation delay time in the clock transfer unit 112 may lead to a variation in the output timing of the optical switch control signal.

Figure 6:
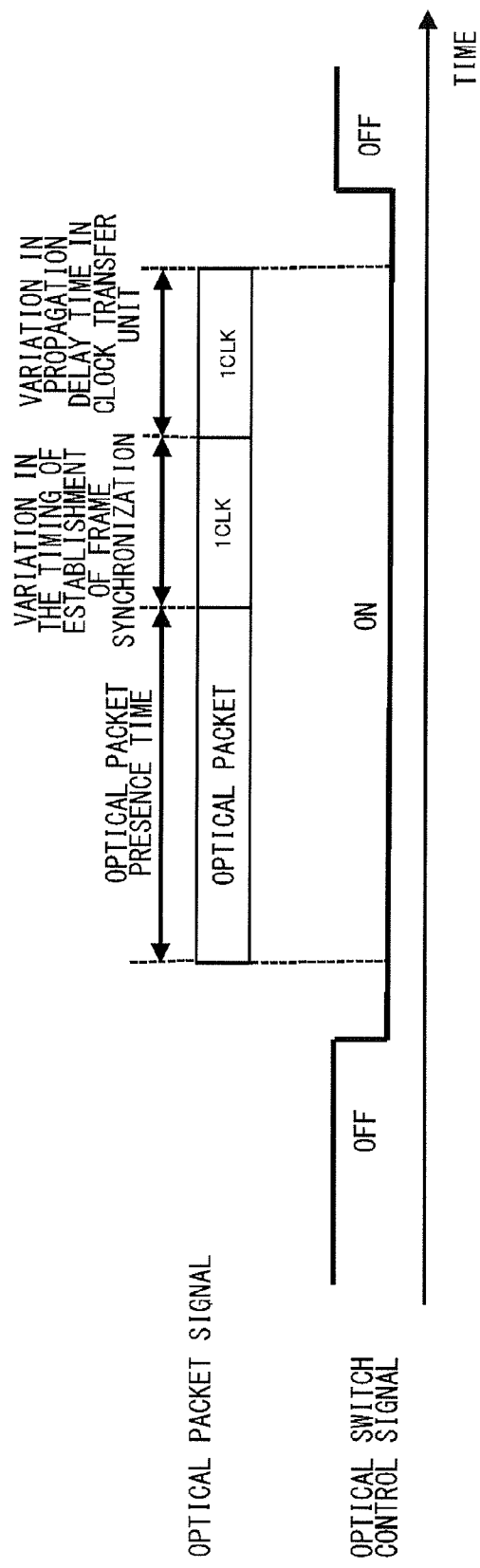
FIG. 6 is a diagram for explaining a problem to be solved by an optical packet switching apparatus according to the comparative example.

FIG. 6 is a diagram for explaining the problem to be solved by the optical packet switching apparatus according to the comparative example. As described above, there may occur a variation equivalent to one clock in the timing of generation of the optical switch control signal, due to the establishment of frame synchronization, and also there may occur another variation equivalent to one clock, due to the transfer of the clock. In order to permit these variations, the optical packet switching apparatus according to the comparative example needs to assure the optical switch on-time which is longer than the actual presence time of the optical packet signal. Yet, as the optical switch on-time becomes longer, the guard time between the optical packet signals becomes longer as well and therefore the bandwidth usage efficiency of the transmission path drops.

Focusing the inventors' attention on the problems as described above, the inventors have made the present invention through diligent investigations. Hereinbelow, optical packet switching apparatuses according to preferred embodiments of the present invention will be explained.

First Embodiment

Figure 7:
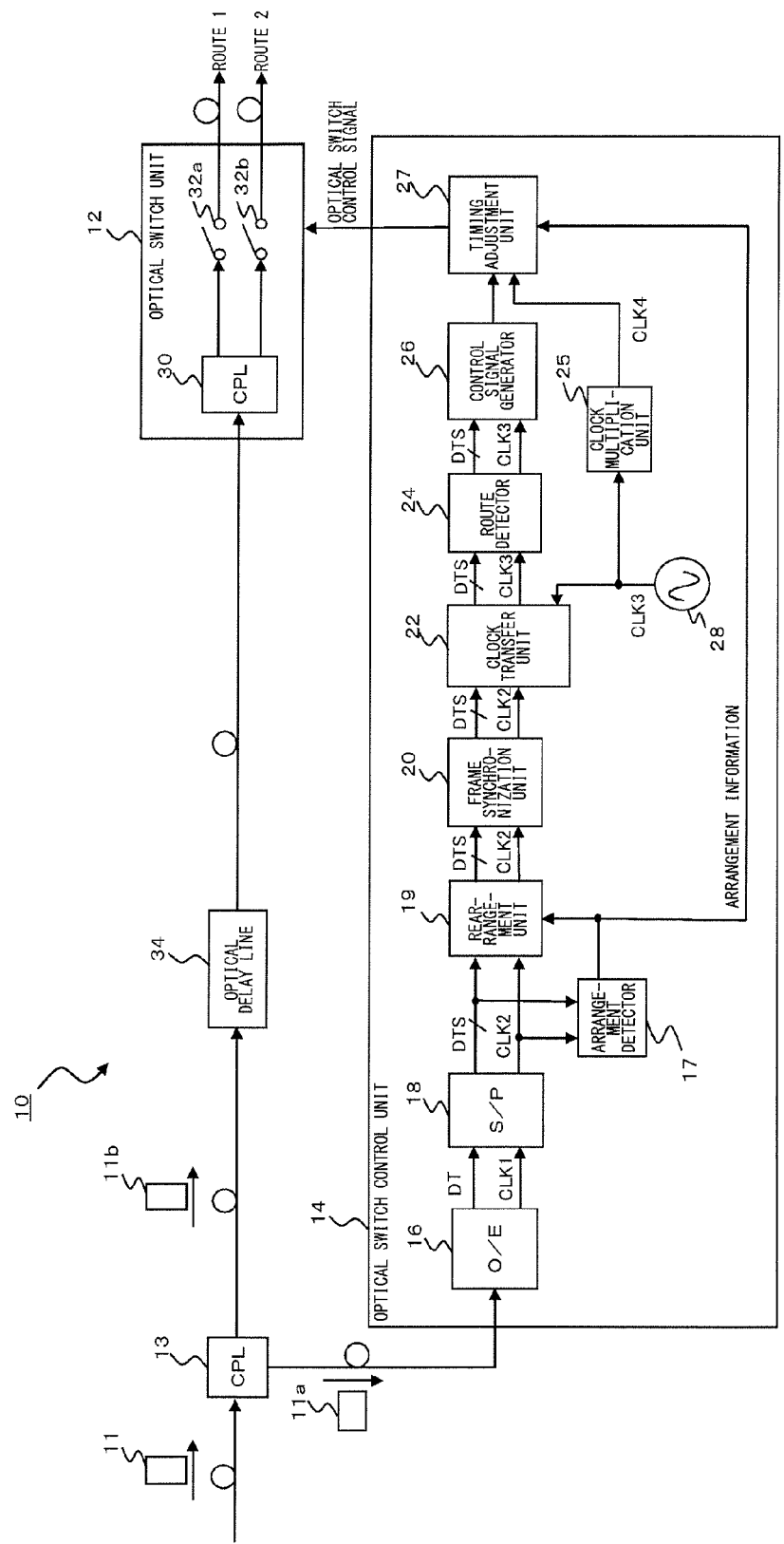
FIG. 7 is a diagram for explaining an optical packet switching apparatus according to a first embodiment of the present invention.

FIG. 7 is a diagram for explaining an optical packet switching apparatus 10 according to a first embodiment of the present invention. As shown in FIG. 7, the optical packet switching apparatus 10 includes an optical coupler 13, an optical switch unit 12, and an optical switch control unit 14. An optical packet signal 11 inputted to the optical packet switching apparatus 10 via a transmission path is bifurcated into two signals by the optical coupler 13. The optical packet signal may be an optical packet signal of 10 GEther or the like, for example.

An optical packet signal 11a, which is one of the bifurcated signals, is inputted to the optical switch control unit 14, whereas an optical packet signal 11b, which is the other of the bifurcated signals, is inputted to the optical switch unit 12 via an optical delay line 34. The optical switch control unit 14 extracts routing information from the optical packet signal 11a and controls the optical switch unit 12 according to the routing information. The optical switch unit 12 outputs the optical packet signal 11b by effecting a route switching for the optical packet signal 11b according to an optical switch control signal fed from the optical switch control unit 14.

As shown in FIG. 7, the optical switch control unit 14 includes an optical-to-electrical (O/E) converter 16, a serial/parallel converter 18, an arrangement detector 17, a rearrangement unit 19, a frame synchronization unit 20, a clock transfer unit 22, a route detector 24, a control signal generator 26, a local oscillator 28, a clock multiplication unit 25, and a timing adjustment unit 27.

The O/E converter 16 O/E-converts the received optical packet 11a, then performs predetermined processes, such as amplification, clock extraction, identification and reproduction, on the O/E-converted optical packet signal 11a, and then outputs a data signal DT and a clock signal CLK1 to the serial/parallel converter 18.

The serial/parallel converter 18 performs serial/parallel conversion on the data signal DT so as to output a parallel data signal DTS and, at the same time, divides the frequency of the clock signal CLK1 and outputs a frequency-divided clock signal CLK2. In the first embodiment, the serial/parallel converter 18 performs a serial/parallel conversion of 1:8. If, for example, the serial data signal DT of 10 Gbps and the clock signal CLK1 of 10 GHz are inputted to the serial/parallel converter 18, the parallel data signals DTS of 1.25 Gps×8 and the frequency-divided clock signal CLK2 of 1.25 GHz will be outputted from the serial/parallel converter 18.

The parallel data signal DTS and the frequency-divided clock signal CLK2 outputted from the serial/parallel converter 18 are inputted to the rearrangement unit 19. The parallel data signal DTS and the frequency-divided clock signal CLK2 are also inputted to the arrangement detector 17. The arrangement detector 17 detects how the frame synchronization patterns contained in the parallel data signal are arranged. The arrangement detector 17 outputs the detected information on the arrangement of the frame synchronization patterns, to the rearrangement unit 19. Based on the information on the arrangement, the rearrangement unit 19 rearranges the frame synchronization patterns such that the frame synchronization patterns are arranged in phase. In the first embodiment, the information on the arrangement obtained from the arrangement detector 17 is also outputted to the timing adjustment unit 27.

The parallel data signal DTS, which has been rearranged by the rearrangement unit 19, and the frequency-divided clock signal CLK2 are inputted to the frame synchronization unit 20. The frame synchronization unit 20 accomplishes frame synchronization of the optical packet signals by detecting a predetermined frame synchronization pattern.

The parallel data signal DATAS and clock signal R-CLK whose frame synchronization is established are inputted to the clock transfer unit 22. The clock transfer unit 22 performs a transfer from the parallel data signal DTS synchronized with the frequency-divided clock signal CLK2 to a local clock signal CLK3 outputted from the local oscillator 28. The local clock signal CLK3 is a clock signal having the same frequency as that of the frequency-divided clock signal CLK2.

The parallel data signal DTS and the local clock signal CLK3 outputted from the clock transfer unit 22 are inputted to the route detector 24. The route detector 24 detects the routing information from the received parallel data signal DTS.

The control signal generator 26 generates an optical switch control signal used to control the turning on and off of an optical switch in the optical switch unit 12 according to the routing information detected by the route detector 24. The thus generated optical switch control signal is inputted to the timing adjustment unit 27.

The timing adjustment unit 27 adjusts the output timing with which the optical switch control signal fed from the control signal generator 26 is outputted to the optical switch unit 12, based on the arrangement information on the frame synchronization pattern. At this time, the timing adjustment unit 27 adjusts the output timing of the optical switch control signal, using a multiplication clock signal CK4 for which the clock signal CLK is multiplied by the clock multiplication unit 25. The clock multiplication unit 25 may be configured by using a phase-locked loop (PLL) circuit and the like.

On the other hand, the optical packet signal 11b, which is the other of the bifurcated signals, is inputted to the optical switch unit 12 after passing through the optical delay line 34. The optical switch unit 12 is a 1×2 optical switch which includes an optical coupler 30 configured to bifurcate the inputted optical packet signal 11b into two signals and a first optical switch 32a and a second optical switch 32b each configured to receive the bifurcated optical packet signal. The on/off of the optical switches 32a and 32b is controlled by the optical switch control signals fed from the control signal generator 26.

Figure 8:
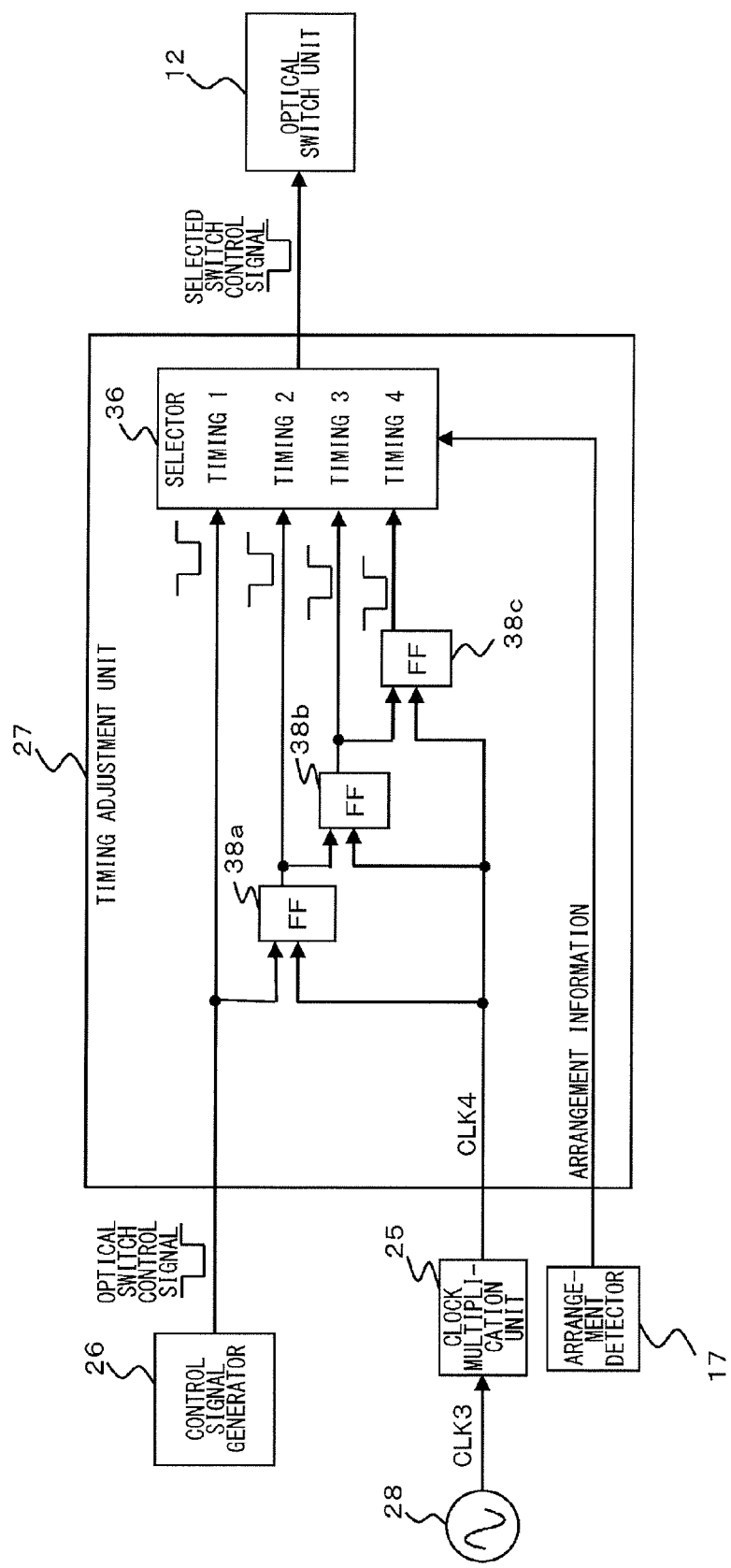
FIG. 8 is a diagram for explaining a structure of a timing adjustment unit in the first embodiment.

FIG. 8 is a diagram for explaining a structure of the timing adjustment unit in the first embodiment. As shown in FIG. 8, the timing adjustment unit 27 includes a selector 36, and first to third flip-flops 38a to 38c.

The optical switch control signal generated by the control signal generator 26 is directly inputted to the selector 36. This optical switch control signal is called herein an optical switch control signal of "timing 1".

The optical switch control signal supplied from the control signal generator 26 and the multiplication clock signal CLK4, for which the local clock signal CLK3 is multiplied by 4 by the clock multiplication unit 25, are inputted to the first flip-flop 38a. For example, if the local clock signal CLK3 is of 1.25 GHz, the multiplication clock signal CLK4 will be of 5 GHz. The optical switch control signal inputted to the first flip-flop 38a lags the optical switch control signal of timing 1 by one clock of the multiplication clock signal CLK4, and the thus delayed optical switch control signal is outputted to the selector 36. This optical switch control signal is called herein an optical switch control signal of "timing 2".

The optical switch control signal supplied from the first flip-flop 38a and the multiplication clock signal CLK4 are inputted to the second flip-flop 38b. The optical switch control signal inputted to the second flip-flop 38b is delayed by one clock of the multiplication clock signal CLK4 and is outputted to the selector 36. In other words, the optical switch control signal supplied from the second flip-flop 38b lags the optical switch control signal of timing 1 by two clocks of the multiplication clock signal CLK4. This optical switch control signal is called herein an optical switch control signal of "timing 3".

The optical switch control signal supplied from the second flip-flop 38b and the multiplication clock signal CLK4 are inputted to the third flip-flop 38c. The optical switch control signal inputted to the third flip-flop 38c is delayed by one clock of the multiplication clock signal CLK4 and is outputted to the selector 36. In other words, the optical switch control signal supplied from the third flip-flop 38c lags the optical switch control signal of timing 1 by three clocks of the multiplication clock signal CLK4. This optical switch control signal is called herein an optical switch control signal of "timing 4".

The information on the arrangement of the frame synchronization patterns is also inputted to the selector 36. The selector 36 determines a phase relationship between the serial data signal DT and the frequency-divided clock signal CLK2, from the inputted arrangement information. Then, one switch control signal is selected from among those of timings 1 to 4 based on said determination result, and the thus selected switch control signal is outputted to the optical switch unit 12.

Figure 9:
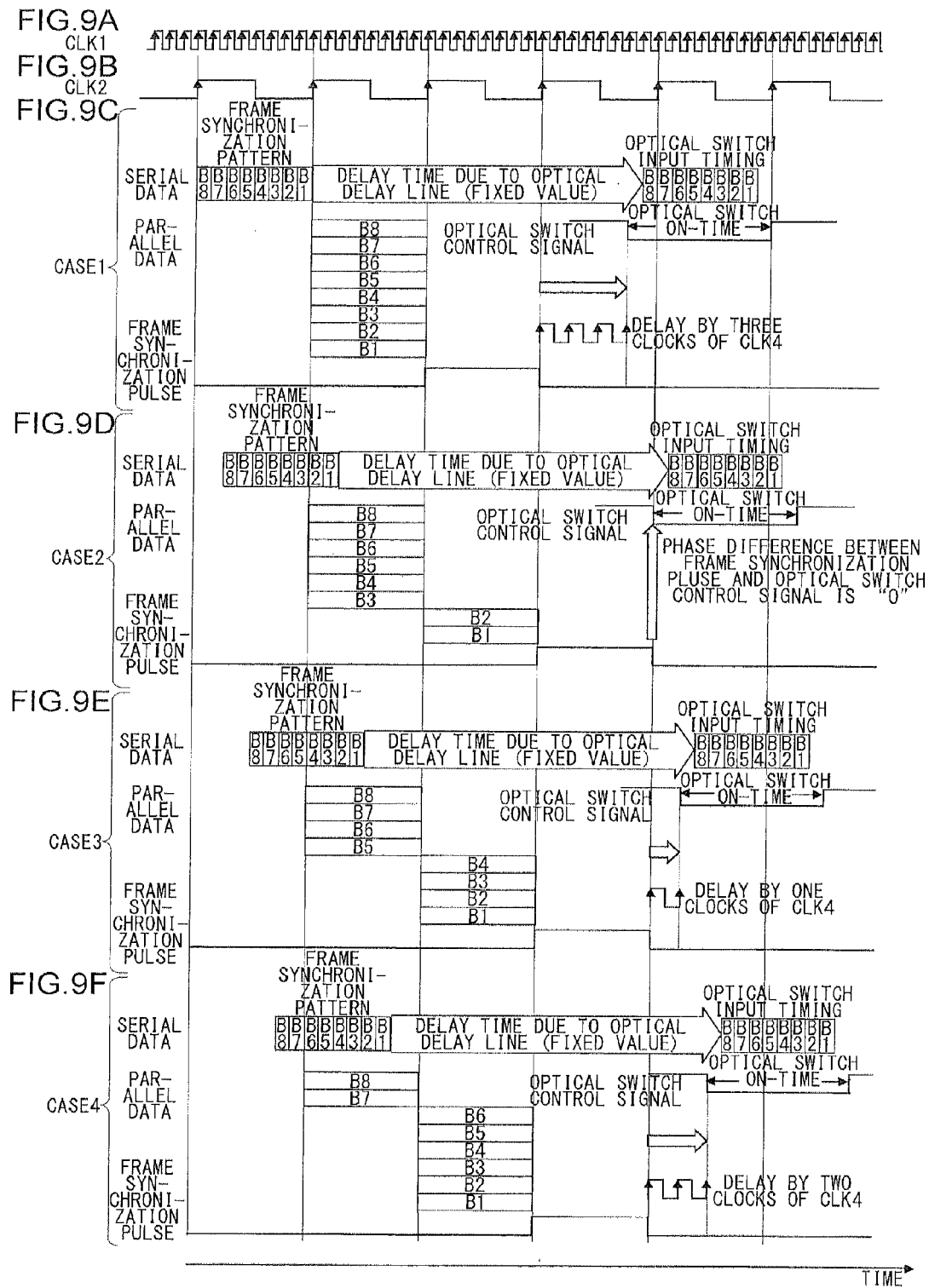
FIGS. 9A to 9F are timing charts for explaining operations of an optical packet switching apparatus according to a first embodiment.

FIGS. 9A to 9F are timing charts for explaining operations of the optical packet switching apparatus 10 according to the first embodiment. FIG. 9A shows a clock signal CLK1 extracted from the serial data signal DT, and FIG. 9B shows a frequency-divided clock signal CLK2 obtained by dividing the frequency of the clock signal CLK1. Assume, in the description of FIGS. 9A to 9F, that the frequency-divided clock signal CLK2 is obtained by dividing the frequency of the clock signal CLK1 by 8. For example, the frequency-divided clock signal CLK2 is of 1.25 GHz when the clock signal CLK1 is of 10 GHz.

FIG. 9C shows a case where the rising edge of the frequency-divided clock signal CLK2 agrees in phase with a frame synchronization pattern B1 in the serial data DT and thereby the serial/parallel conversion has been done so that the frame synchronization patterns B1 to B8 can be arranged in phase with one another. This case is called "Case 1". In FIG. 9C, the frame synchronization patterns only are shown in the serial data signal DT and the parallel data signal DTS.

FIG. 9D shows a case where the rising edge of the frequency-divided clock signal CLK2 agrees in phase with the frame synchronization pattern B3 in the serial data DT and thereby the serial/parallel conversion has been done so that the frame synchronization patterns B3 to B8 can be arranged in phase with one another and the frame synchronization patterns B1 and B2 can be arranged out of phase by one clock of the frequency-divided clock signal CLK2. This case is called "Case 2".

FIG. 9E shows a case where the rising edge of the frequency-divided clock signal CLK2 agrees in phase with the frame synchronization pattern B5 in the serial data DT and thereby the serial/parallel conversion has been done so that the frame synchronization patterns B5 to B8 can be arranged in phase with one another and the frame synchronization patterns B1 to B4 can be arranged out of phase by one clock of the frequency-divided clock signal CLK2. This case is called "Case 3".

FIG. 9F shows a case where the rising edge of the frequency-divided clock signal CLK2 agrees in phase with the frame synchronization pattern B7 in the serial data DT and thereby the serial/parallel conversion has been done so that the frame synchronization patterns B7 and B8 can be arranged in phase with each other and the frame synchronization patterns B1 to B6 can be arranged out of phase by one clock of the frequency-divided clock signal CLK2. This case is called "Case 4".

The differences in the arrangement of the frame synchronization patterns as in Case 1 to Case 4 occurs because the phase relationship between the serial data signal DT and the frequency-divided clock signal CLK2 is indefinite. In the frame synchronization unit 20, a frame synchronization pulse is outputted when all of the frame synchronization patterns are detected. Thus, as shown in FIG. 9C to FIG. 9F, the timing of the frame synchronization pulse is lagged by one clock of the frequency-divided clock signal CLK2 in Case 1 where the frame synchronization patterns B1 to B8 are arrange in phase with one another and in Case 2 to Case 4 where the frame synchronization patterns B1 to B8 lie over two clocks.

Thus, according to the first embodiment, four optical switch control signals whose output timings to the optical switch unit 12 differ are prepared in advance. In parallel with this process, whether the phase relationship between the serial data signal data DT and the frequency-divided clock signal CLK2 corresponds to which one of Case 1 to Case 4 is determined based on the arrangement information on the frame synchronization pattern supplied from the arrangement detector 17. Then, a switch control signal is selected from among those of timings 1 to 4, based on this determination result, and the thus selected signal is outputted to the optical switch unit 12.

In the first embodiment, if the frame synchronization patterns are arranged like Case 2, the selector 36 will select the optical switch control signal of "timing 1". Here, the control signal generator 26 outputs the optical switch control signal in such a manner that the phase difference between the frame synchronization pulse and the optical switch control signal becomes "0". In other words, the optical switch control signal is outputted in such a manner that difference between the falling edge of the frame synchronization pattern and the output timing of the optical switch control signal becomes "0". Based on the output timing of the optical switch control signal in this Case 2 as a reference, the output timings of the other cases (Case 1, Case 3 and Case 4) are adjusted.

If the frame synchronization patterns are arranged like "Case 3", the selector 36 will select the optical switch control signal of "timing 2" and the thus selected signal will be outputted to the optical switch unit 12. In this case, as shown in FIG. 9E, the switch control signal, which lags the falling edge of the frame synchronization pulse by one clock of the multiplication clock signal CLK4, is outputted from the selector 36.

If the frame synchronization patterns are arranged like "Case 4", the selector 36 will select the optical switch control signal of "timing 3" and the thus selected signal will be outputted to the optical switch unit 12. In this case, as shown in FIG. 9F, the switch control signal, which lags the falling edge of the frame synchronization pulse by two clocks of the multiplication clock signal CLK4, is outputted from the selector 36.

If the frame synchronization patterns are arranged like "Case 1", the selector 36 will select the optical switch control signal of "timing 4" and the thus selected signal will be outputted to the optical switch unit 12. In this case, as shown in FIG. 9C, the switch control signal, which lags the falling edge of the frame synchronization pulse by three clocks of the multiplication clock signal CLK4, is outputted from the selector 36.

By employing the optical packet switching apparatus 10 according to the first embodiment, the optical switch can be turned on in time with the input timing of the optical packet signal to the optical switch unit 12, as shown in FIG. 9C to FIG. 9F. As a result, the optical switch on-time can be shortened as compared with the above-described comparative example.

There may be cases where the arrangement of the frame synchronization patterns does not fall into four cases of Case 1 to Case 4, depending on the phase relationship between the serial data signal DT and the frequency-divided clock signal CLK2. In such a case, the selector 36 determines the case which is closest to the actual arrangement, for example, and then selects the optical switch control signal corresponding to the thus determined case.

As described as above, the optical packet switching apparatus 10 according to the first embodiment is configured such that (i) the four optical switch control signals whose output timings differ are prepared in the timing adjustment unit 27, (ii) the optical switch control signal with the most suitable timing is selected based on the arrangement information on the frame synchronization patterns fed from the arrangement detector 17, and (iii) the thus selected optical switch control signal is outputted to the optical switch unit 12. As a result, the optical switch on-time can be shortened and thereby the guard time can be shortened. Thus the bandwidth usage efficiency of the transmission path can be improved.

Also, the optical packet switching apparatus 10 according to the first embodiment is configured such that the output timing of the optical switch control signal is adjusted using the multiplication clock signal CLK4 which is obtained by multiplying the local clock signal CLK3. As compared with a case where the optical switch control signal is outputted in synchronism with the changing points of the local clock signal CLK3, the resolution of on/off timing of the optical switch can be raised and therefore the extra optical switch on-time can be reduced.

Second Embodiment

Figure 10:
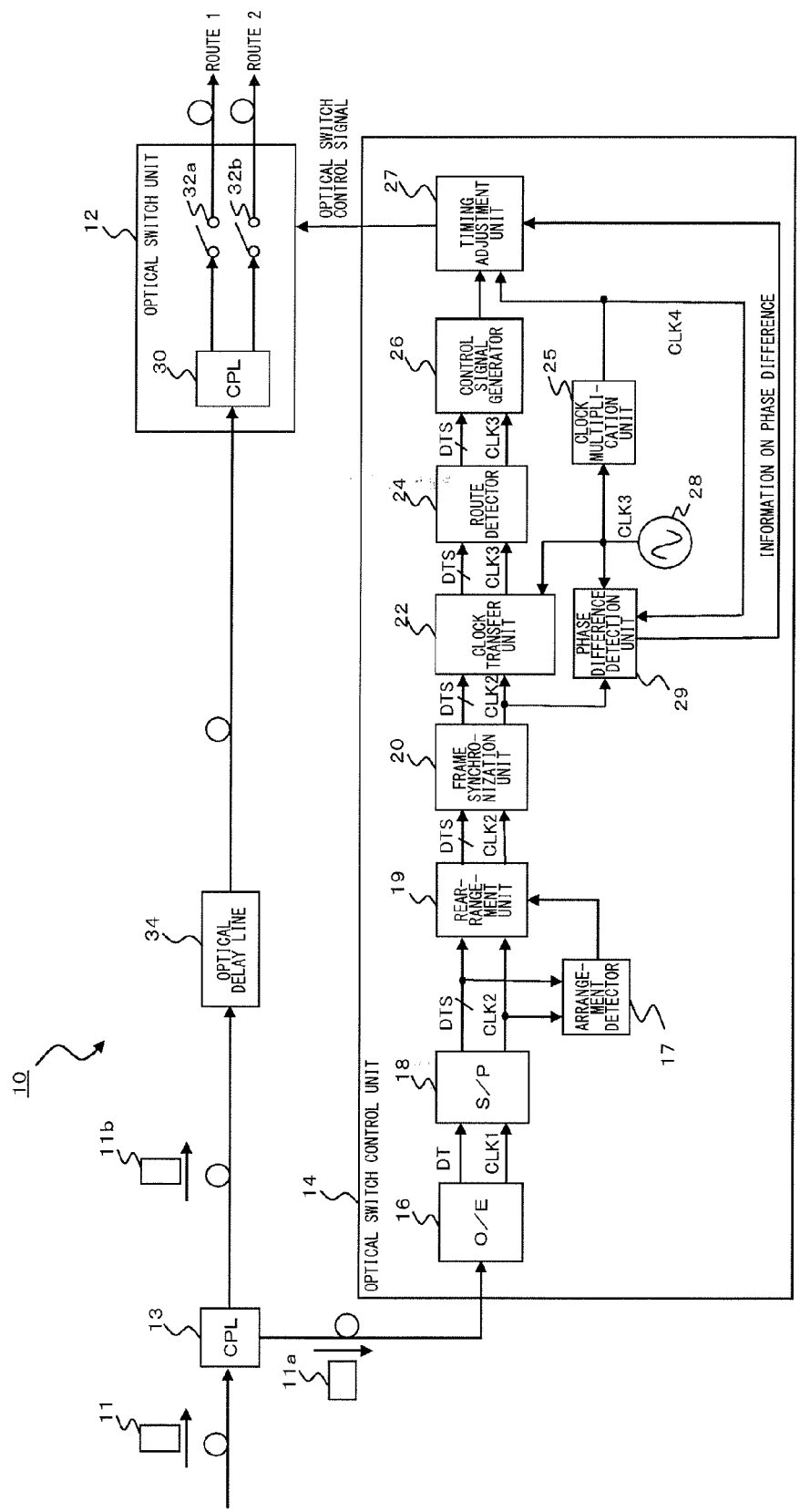
FIG. 10 is a diagram for explaining an optical packet switching apparatus according to a second embodiment of the present invention.

FIG. 10 is a diagram for explaining an optical packet switching apparatus 10 according to a second embodiment of the present invention. Components of the optical packet switching apparatus 10 according to the second embodiment which are identical to or correspond to those of the optical packet switching apparatus 10 according to the first embodiment shown in FIG. 7 are given the same reference numerals herein and the repeated description thereof are omitted as appropriate.

As shown in FIG. 10, the optical packet switching apparatus 10 according to the second embodiment includes a phase difference detection unit configured to detect the phase difference between a frequency-divided clock signal CLK2 inputted to the clock transfer unit 22 and a local clock signal CLK3. In the clock transfer unit 22, the frequency-divided clock signal CLK2 is a write clock, and the local clock signal CLK3 is read clock. The phase difference detection unit 29 detects the phase difference between the frequency-divided clock signal CLK2 and the local clock signal CLK3, using a multiplication clock signal CLK4 which is obtained by multiplying the local clock signal CLK3 by the clock multiplication unit 25. Then, phase difference information detected by the phase difference detection unit 29 is sent to the timing adjustment unit 27.

The timing adjustment unit 27 adjusts the timing with which the optical switch control signal fed from the control signal generator 26 is outputted to the optical switch unit 12, based on the phase difference information detected by the phase difference detection unit 29. In so doing, the timing adjustment unit 27 adjusts the output timing of the optical switch control signal, using the multiplication clock signal CLK4.

Figure 11:
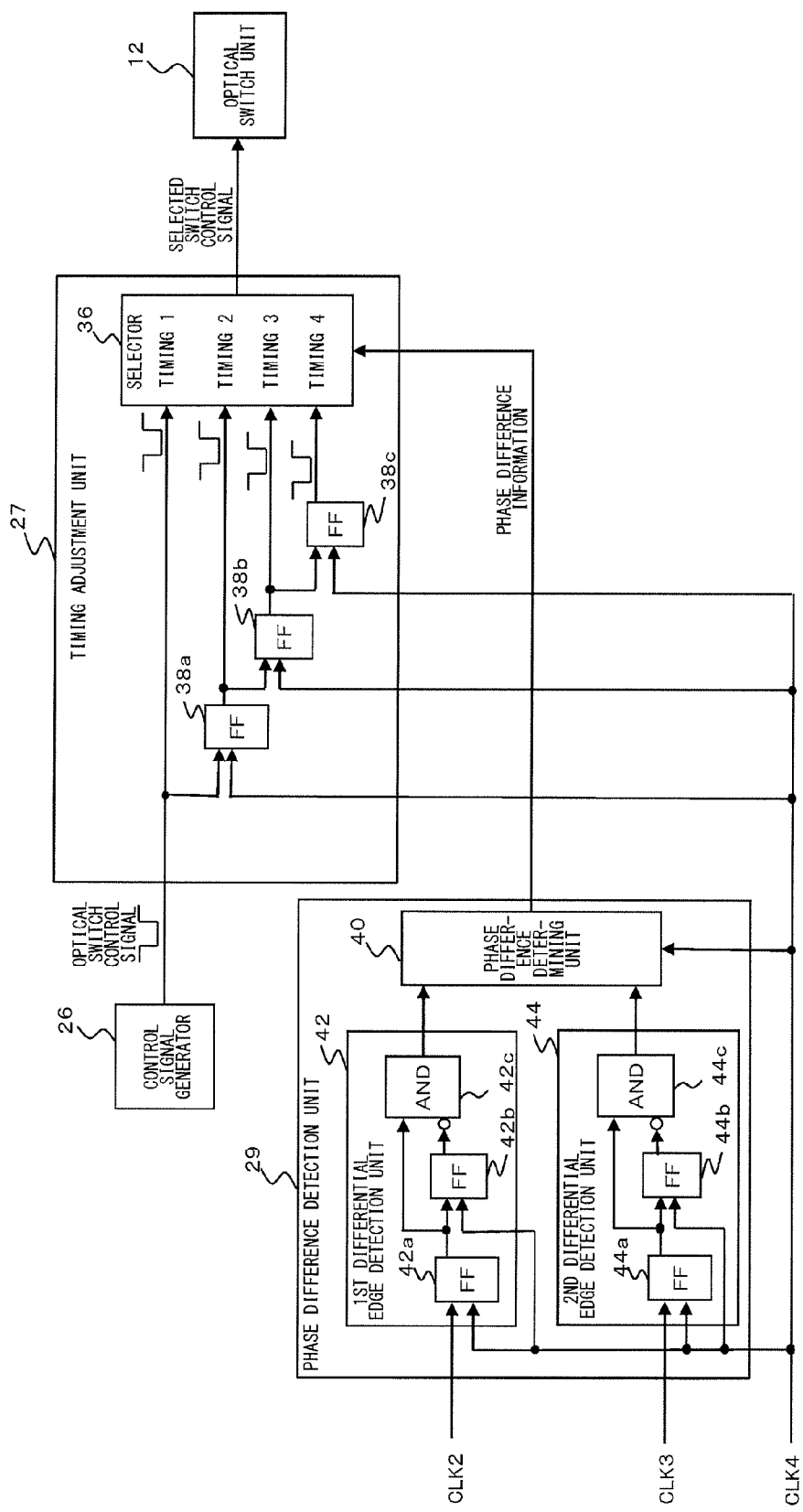
FIG. 11 is a diagram for explaining structures of a phase difference detection unit and a timing adjustment unit in a second embodiment.

FIG. 11 is a diagram for explaining structures of the phase difference detection unit 29 and the timing adjustment unit 27 in the second embodiment.

As shown in FIG. 11, the phase difference detection unit 29 includes a first differential edge detection unit 42, a second differential edge detection unit 44, and a phase difference determining unit 40.

The first differential edge detection unit 42 differentiates the inputted frequency-divided clock signal CLK2 and thereby detects a rising edge of the frequency-divided clock signal CLK2. The first differential edge detection unit 42 includes flip-flops 42a and 42b, and a logical product (AND) computing unit 42c. The frequency-divided clock signal CLK2 and the multiplication clock signal CLK4 are inputted to the flip-flop 42a. An output of the flip-flop 42a and the multiplication clock signal CLK4 are inputted to the flip-flop 42b. The output of the flip-flop 42a and the inverted output of the flip-flop 42b are inputted to the AND computing unit 42c. An output of the AND computing unit 42c is inputted to the phase difference determining unit 40.

The second differential edge detection unit 44 differentiates the inputted local clock signal CLK3 and thereby detects a rising edge of the local clock signal CLK3. The second differential edge detection unit 44 includes flip-flops 44a and 44b, and a AND computing unit 44c. The local clock signal CLK3 and the multiplication clock signal CLK4 are inputted to the flip-flop 44a. An output of the flip-flop 44a and the multiplication clock signal CLK4 are inputted to the flip-flop 44b. The output of the flip-flop 44a and the inverted output of the flip-flop 44b are inputted to the AND computing unit 42c. An output of the AND computing unit 44c is inputted to the phase difference determining unit 40.

Though in the first embodiment the first differential edge detection unit 42 and the second differential edge detection unit 44 are of a structure such that the rising edge of a clock signal is detected, they may be of a structure such that the falling edge thereof is detected.

The phase difference determining unit 40 determines the phase difference between an output pulse supplied from the first differential edge detection unit 42 and an output pulse from the second differential edge detection unit 44, using the multiplication clock signal CLK4. Phase difference information detected by the phase difference determining unit 40 is outputted to the selector 36 of the timing adjustment unit 27.

The timing adjustment unit 27 includes a selector 36, and first to third flip-flops 38a to 38c. In the present embodiment, the optical switch control signal generated by the control signal generator 26 is directly inputted to the selector 36. This optical switch control signal is called herein an optical switch control signal of "timing 1".

The optical switch control signal supplied from the control signal generator 26 and the multiplication clock signal CLK4 are inputted to the first flip-flop 38a. The optical switch control signal inputted to the first flip-flop 38a lags the optical switch control signal of timing 1 by one clock of the multiplication clock signal CLK4, and the thus delayed optical switch control signal is outputted to the selector 36. This optical switch control signal is called herein an optical switch control signal of "timing 2".

The optical switch control signal supplied from the first flip-flop 38a and the multiplication clock signal CLK4 are inputted to the second flip-flop 38b. The optical switch control signal supplied from the second flip-flop 38b lags the optical switch control signal of timing 1 by two clocks of the multiplication clock signal CLK4. This optical switch control signal is called herein an optical switch control signal of "timing 3".

The optical switch control signal supplied from the second flip-flop 38*b* and the multiplication clock signal CLK4 are inputted to the third flip-flop 38*c*. The optical switch control signal supplied from the third flip-flop 38*c* lags the optical switch control signal of timing 1 by three clocks of the multiplication clock signal CLK4. This optical switch control signal is called herein an optical switch control signal of "timing 4".

The selector 36 selects the optical switch control signal with the most suitable timing from among the optical switch control signal of timing 1 to the optical switch control signal of timing 4, based on the phase difference information fed from the phase difference determining unit 40, and then outputs the thus selected optical switch control signal to the optical switch unit 12.

Figure 12:
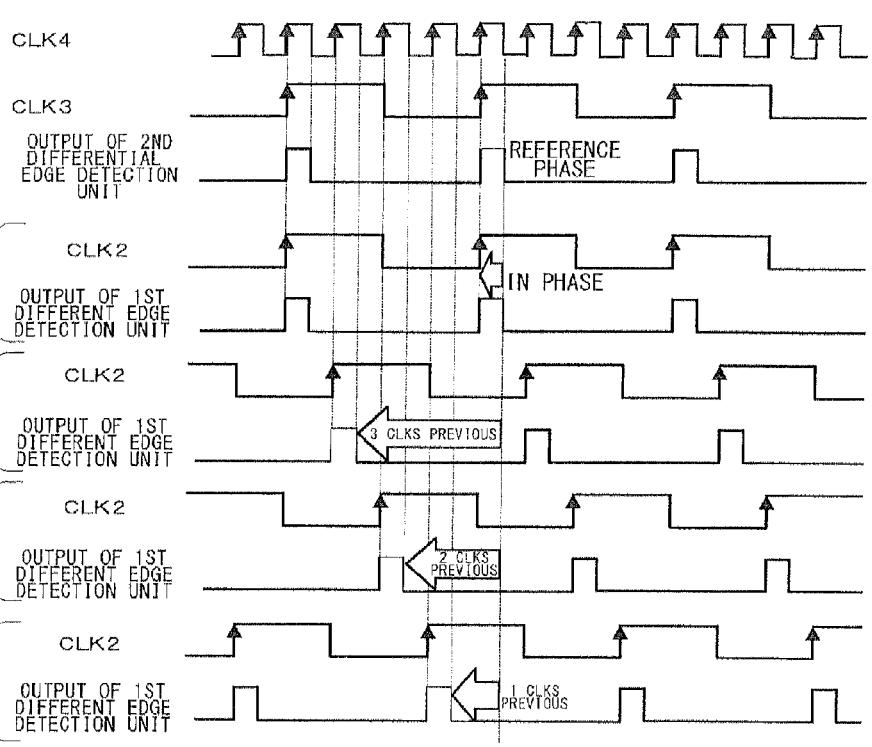
FIGS. 12A to 12G are timing charts for explaining operations of an optical packet switching apparatus according to a second embodiment.

FIGS. 12A to 12G are timing charts for explaining operations of the optical packet switching apparatus 10 according to the second embodiment. FIG. 12A shows a multiplication clock signal, FIG. 9B shows a local clock signal CLK3, and FIG. 12C shows an output of the second differential edge detection unit 44. Assume, in the description of FIGS. 12A to 12G, that the multiplication clock signal CLK4 is obtained by multiplying the local clock signal CLK3 by 4. For example, the multiplication clock signal CLK4 is of 5 GHz when the local clock signal CLK4 is of 1.25 GHz.

As shown in FIG. 12C, the second differential edge detection unit 44 outputs a pulse synchronized with the rising edge of the local clock signal CLK3. In the present embodiment, the phase difference determining unit 40 uses the phase of the output pulse of this second differential edge detection unit 44 as a reference pulse, and determines the position of the phase of the output pulse of the first differential edge detection unit 42 relative to the reference pulse in terms of where the position thereof is located before how many clocks of the multiplication clock signal CLK4. Thereby, the phase difference determining unit 40 determines the phase difference between the frequency-divided clock signal CLK2 and the local clock signal CLK3.

FIG. 12D shows Case 1 where the phase difference between the frequency-divided clock signal CLK2 and the local clock signal CLK3 is 0 degree. In this Case 1, the output pulse of the first differential edge detection unit 42 and the output pulse of the second differential edge detection unit 44 are in phase with each other. In this Case 1, the propagation delay time in the clock transfer unit 22 is shortest.

FIG. 12E shows Case 2 where the phase difference between the frequency-divided clock signal CLK2 and the local clock signal CLK3 is 270 degrees. Since, in this Case 2, the output pulse of the first differential edge detection unit 42 exists before the reference phase by three clocks of the multiplication clock CLK4, the phase difference between the frequency-divided clock signal CLK2 and the local clock signal CLK3 is 270 degrees. In this Case 2, the propagation delay time in the clock transfer unit 22 is longer than Case 1 by three clocks of the multiplication clock signal CLK4.

FIG. 12F shows Case 3 where the phase difference between the frequency-divided clock signal CLK2 and the local clock signal CLK3 is 180 degrees. Since, in this Case 3, the output pulse of the first differential edge detection unit 42 exists before the reference phase by two clocks of the multiplication clock CLK4, the phase of the frequency-divided clock CLK2 lags the phase of the local clock signal CLK3 by 180 degrees. In this Case 3, the propagation delay time in the clock transfer unit 22 is longer than Case 1 by two clocks of the multiplication clock signal CLK4.

FIG. 12G shows Case 4 where the phase difference between the frequency-divided clock signal CLK2 and the local clock signal CLK3 is 90 degrees. Since, in this Case 4, the output pulse of the first differential edge detection unit 42 exists before the reference phase by one clock of the multiplication clock CLK4, the phase of the frequency-divided clock CLK2 lags the phase of the local clock signal CLK3 by 90 degrees. In this Case 4, the propagation delay time in the clock transfer unit 22 is longer than Case 1 by one clock of the multiplication clock signal CLK4.

The phase difference determining unit 40 determines which case (among Case 1 to Case 4) corresponds to the phase difference between the frequency-divided clock signal CLK2 and the local clock signal CLK3, and outputs this determination result to the selector 36 as the phase difference information. Since the phase relationship between the frequency-divided clock signal CLK2 and the local clock CLK3 is indefinite, there may be cases where the phase difference therebetween does not fall into an exact case among Case 1 to Case 4. In such a case, the phase difference determining unit 40 determines the case which is closest to the actual phase difference, for example, and then outputs the thus determined case to the selector 36.

If the information indicating that the phase difference between the frequency-divided clock signal CLK2 and the local clock signal CLK3 is 0 degree (Case 1) is inputted from the phase difference determining unit 40, the selector 36 will select the optical switch control signal of timing 1 and output it to the optical switch unit 12.

If the information indicating that the phase difference between the frequency-divided clock signal CLK2 and the local clock signal CLK3 is 90 degrees (Case 4) is inputted from the phase difference determining unit 40, the selector 36 will select the optical switch control signal of timing 2 and output it to the optical switch unit 12.

If the information indicating that the phase difference between the frequency-divided clock signal CLK2 and the local clock signal CLK3 is 180 degrees (Case 3) is inputted from the phase difference determining unit 40, the selector 36 will select the optical switch control signal of timing 3 and output it to the optical switch unit 12.

If the information indicating that the phase difference between the frequency-divided clock signal CLK2 and the local clock signal CLK3 is 270 degrees (Case 2) is inputted from the phase difference determining unit 40, the selector 36 will select the optical switch control signal of timing 4 and output it to the optical switch unit 12.

As described as above, the optical switch control signals of timings 1 to 4 are prepared, and the optical switch control signal with the most suitable timing is selected based on the phase difference information fed from the phase difference detection unit 29. Hence, the optical switch can be turned on in time with the input timing of the optical packet signal to the optical switch unit 12. As a result, the optical switch on-time can be shortened as compared with the above-described comparative example.

Also, the optical packet switching apparatus 10 according to the second embodiment is configured such that the output timing of the optical switch control signal is adjusted using the multiplication clock signal CLK4 which is obtained by multiplying the local clock signal CLK3. As compared with the case where the optical switch control signal is outputted in synchronism with the changing points of the local clock signal CLK3, the resolution of on/off timing of the optical switch can be raised and therefore the extra optical switch on-time can be reduced.

Figure 13:
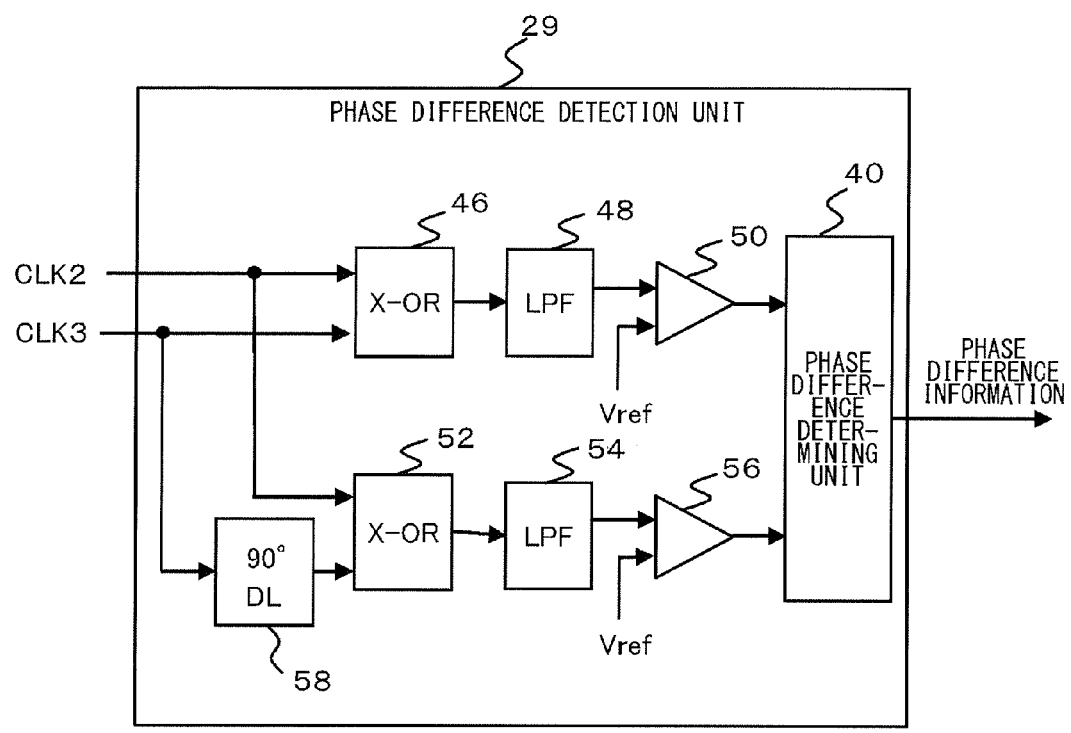
FIG. 13 shows a modification of a phase difference detection unit.

FIG. 13 shows a modification of the phase difference detection unit. As shown in FIG. 13, the phase difference detection unit 29 according to the modification includes a first exclusive-OR computing unit (X-OR) 46, a second exclusive-OR computing unit (X-OR) 52, a first low-pass filter (LPF) 48, a second low-pass filter (LPF) 54, a first comparator 50, a second comparator 56, a 90-degree phase delay unit (DL) 58, and a phase difference determining unit 40.

The frequency-divided clock signal CLK2 and the local clock signal CLK3 are inputted to the first exclusive-OR computing unit 46. The first exclusive-OR computing unit 46 computes exclusive-OR of the frequency-divided clock signal CLK2 and the local clock signal CLK3, and outputs a resulting exclusive-OR signal (hereinafter referred to as "first exclusive-OR signal X-OR1") to the first low-pass filter 48. Also, the frequency-divided clock signal CLK2 and the local clock signal CLK3 whose phase has been delayed by 90 degrees by the 90-degree phase delay unit 58 are inputted to the second exclusive-OR computing unit 52 (hereinafter this clock signal will be referred to as "delayed local clock signal CLK3-DLY"). The second exclusive-OR computing unit 52 computes exclusive-OR of the frequency-divided clock signal CLK2 and the delayed local clock signal CLK3-DLY, and outputs a resulting exclusive-OR signal (hereinafter referred to as "second exclusive-OR signal X-OR2") to the second low-pass filter 54.

Note here that the local clock signal CLK3 and the frequency-divided clock signal CLK2 whose phase has been delayed by 90 degrees by the 90-degree phase delay unit 58 may be inputted to the second exclusive-OR computing unit 52.

Figure 14:
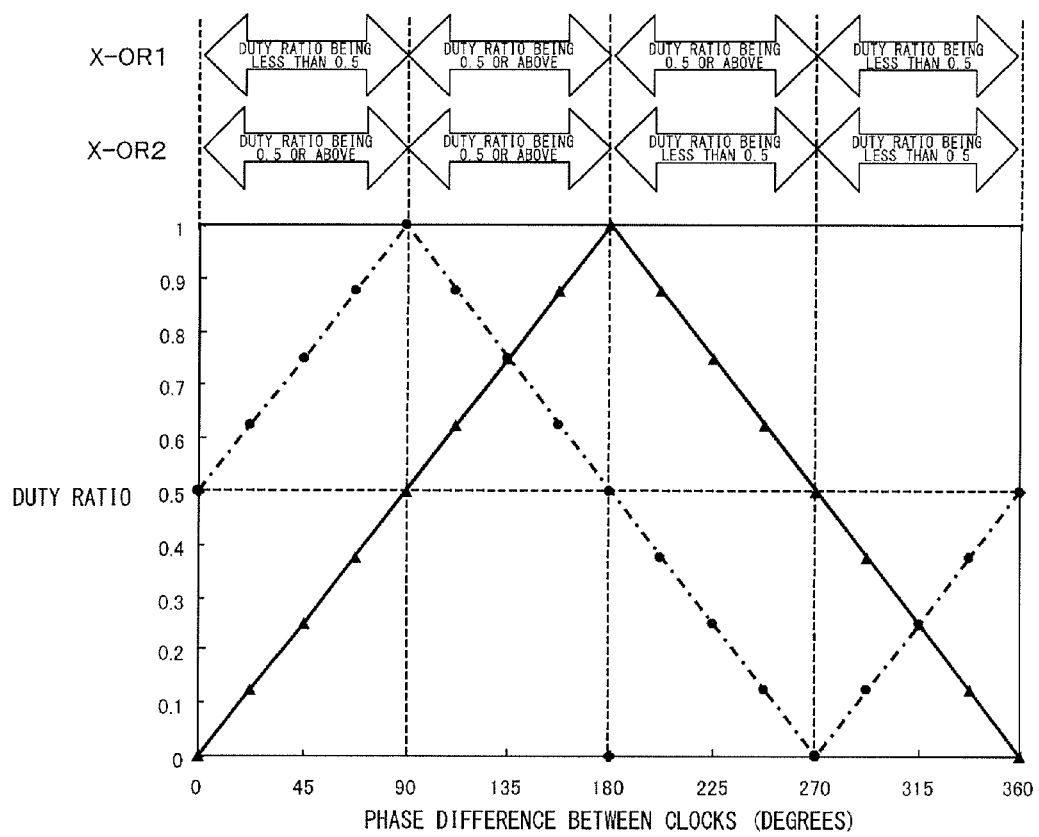
FIG. 14 shows a relationship between a phase difference, between a frequency-divided clock signal and a local clock signal, and a duty ratio of an exclusive-OR signal.

FIG. 14 shows a relationship between a phase difference, between a frequency-divided clock signal and a local clock signal, and a duty ratio of an exclusive-OR signal. In FIG. 14, the solid line indicates a relationship between the phase difference between clocks and the duty ratio of the first exclusive-OR signal X-OR1. Also, a dashed-dotted line indicates a relationship between the phase difference between clocks and the duty ratio of the second exclusive-OR signal X-OR.

As shown in FIG. 14, both the duty ratio of the first exclusive-OR signal X-OR1 and the duty ratio of the second exclusive-OR signal X-OR2 vary according to the phase difference between clocks but how the duty ratio thereof changes differ between the first exclusive-OR signal X-OR1 and the second exclusive-OR signal X-OR2. Referencing the duty ratios of the first exclusive-OR signal X-OR1 and the second exclusive-OR signal X-OR2 determines which of ranges among range 1 to range 4 the phase difference between clocks belongs to. Here, range 1 indicates the range of 0 to 90 degrees, range 2 the range of 90 to 180 degrees, range 3 the range of 180 to 270 degrees, and range 4 the range of 270 to 360 degrees.

More specifically, when the duty ratio of the first exclusive-OR signal X-OR1 is less than 0.5 and the duty ratio of the second exclusive-OR signal X-OR2 is 0.5 or above, it can be determined that the phase difference between clocks belongs to the range of 0 to 90 degrees. Also, when the duty ratio of the first exclusive-OR signal X-OR1 is 0.5 or above and the duty ratio of the second exclusive-OR signal X-OR2 is 0.5 or above, it can be determined that the phase difference between clocks belongs to the range of 90 to 180 degrees. Also, when the duty ratio of the first exclusive-OR signal X-OR1 is 0.5 or above and the duty ratio of the second exclusive-OR signal X-OR2 is less than 0.5, it can be determined that the phase difference between clocks belongs to the range of 180 to 270 degrees. Also, when the duty ratio of the first exclusive-OR signal X-OR1 is less than 0.5 and the duty ratio of the second exclusive-OR signal X-OR2 is less than 0.5, it can be determined that the phase difference between clocks belongs to the range of 270 to 360 degrees.

Referring back to FIG. 13, in order to make the above-described decisions, the first exclusive-OR signal X-OR1 is inputted to the first low-pass filter 48 in the phase difference detection unit 29 according to the present modification so as to derive an average voltage of the first exclusive-OR signal X-OR1. Then this average voltage is inputted to the first comparator 50 and is compared against a predetermined reference voltage Vref. The reference voltage Vref is set to an average voltage of an exclusive-OR signal where the duty ratio is 0.5. Also, the second exclusive-OR signal X-OR2 is inputted to the second low-pass filter 54 so as to derive an average voltage of the second exclusive-OR signal X-OR2. Then this average voltage is inputted to the second comparator 56 and is compared against the reference voltage Vref. An output signal of the first comparator and an output signal of the second comparator 56 are inputted to the phase difference determining unit 40.

By referencing the input signals from the first comparator 50 and the second comparator 56, the phase difference determining unit 40 determines which one of the above-described four ranges the difference between clocks belongs to. The phase difference information determined by the phase difference determining unit 40 is sent to the selector 36 of the timing adjustment unit 27 explained in conjunction with FIG. 11. If the phase difference between clocks belongs to the range of 0 to 90 degrees, for instance, the timing adjustment unit 27 will select the optical switch control signal of timing 1. Also, if the phase difference between clocks belongs to the range of 90 to 180 degrees, the timing adjustment unit 27 will select the optical switch control signal of timing 2. Also, if the phase difference between clocks belongs to the range of 180 to 270 degrees, the timing adjustment unit 27 will select the optical switch control signal of timing 3. Also, if the phase difference between clocks belongs to the range of 270 to 360 degrees, the timing adjustment unit 27 will select the optical switch control signal of timing 4.

Figure 15:
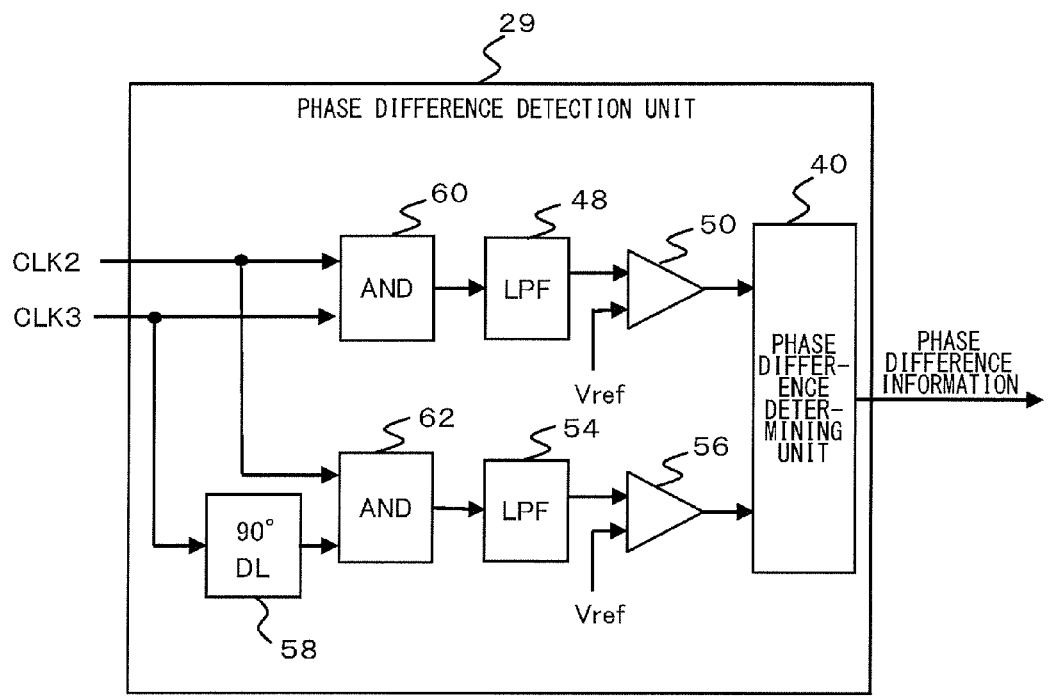
FIG. 15 shows another modification of a phase difference detection unit.

FIG. 15 shows another modification of the phase difference detecting unit. As shown in FIG. 15, the phase difference detection unit 29 according to the another modification is configured such that the first exclusive-OR computing unit 46 and the second exclusive-OR computing unit 52 shown in FIG. 13 are replaced by a first logical AND computing unit 60 and a second logical AND computing unit 62, respectively. Also, according to the another modification, the reference voltage Vref is set to an average voltage of a logical AND signal where the duty ratio is 0.25. By employing a method analogous to that used in the phase difference detection unit 29 as shown in FIG. 13, the phase difference detection unit 29 according to the another modification can determine the range to which the phase difference between clocks belongs.

Figure 16:
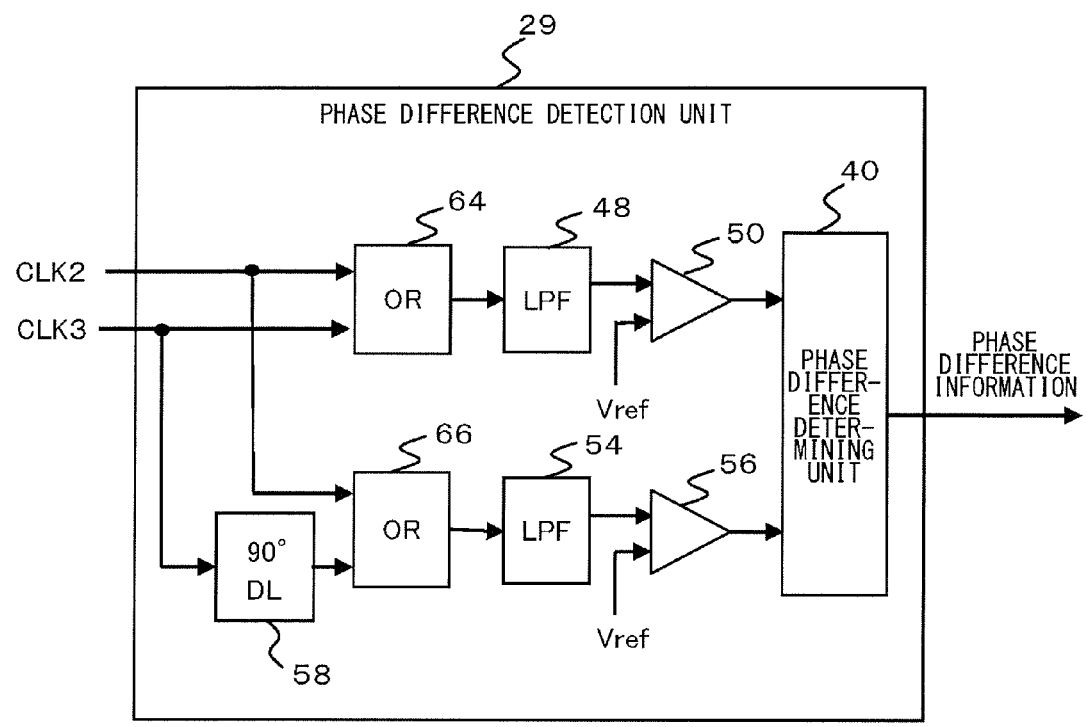
FIG. 16 shows still another modification of a phase difference detection unit.

FIG. 16 shows still another modification of the phase difference detection unit. As shown in FIG. 16, the phase difference detection unit 29 according to the still another modification is configured such that the first exclusive-OR computing unit 46 and the second exclusive-OR computing unit 52 shown in FIG. 13 are replaced by a first logical OR computing unit 64 and a second logical OR computing unit 66, respectively. Also, according to the still another modification, the reference voltage Vref is set to an average voltage of a logical OR signal where the duty ratio is 0.75. By employing a method analogous to that used in the phase difference detection unit 29 as shown in FIG. 13, the phase difference detection unit 29 according to the still another modification can determine the range to which the phase difference between clocks belongs.

Third Embodiment

Figure 17:
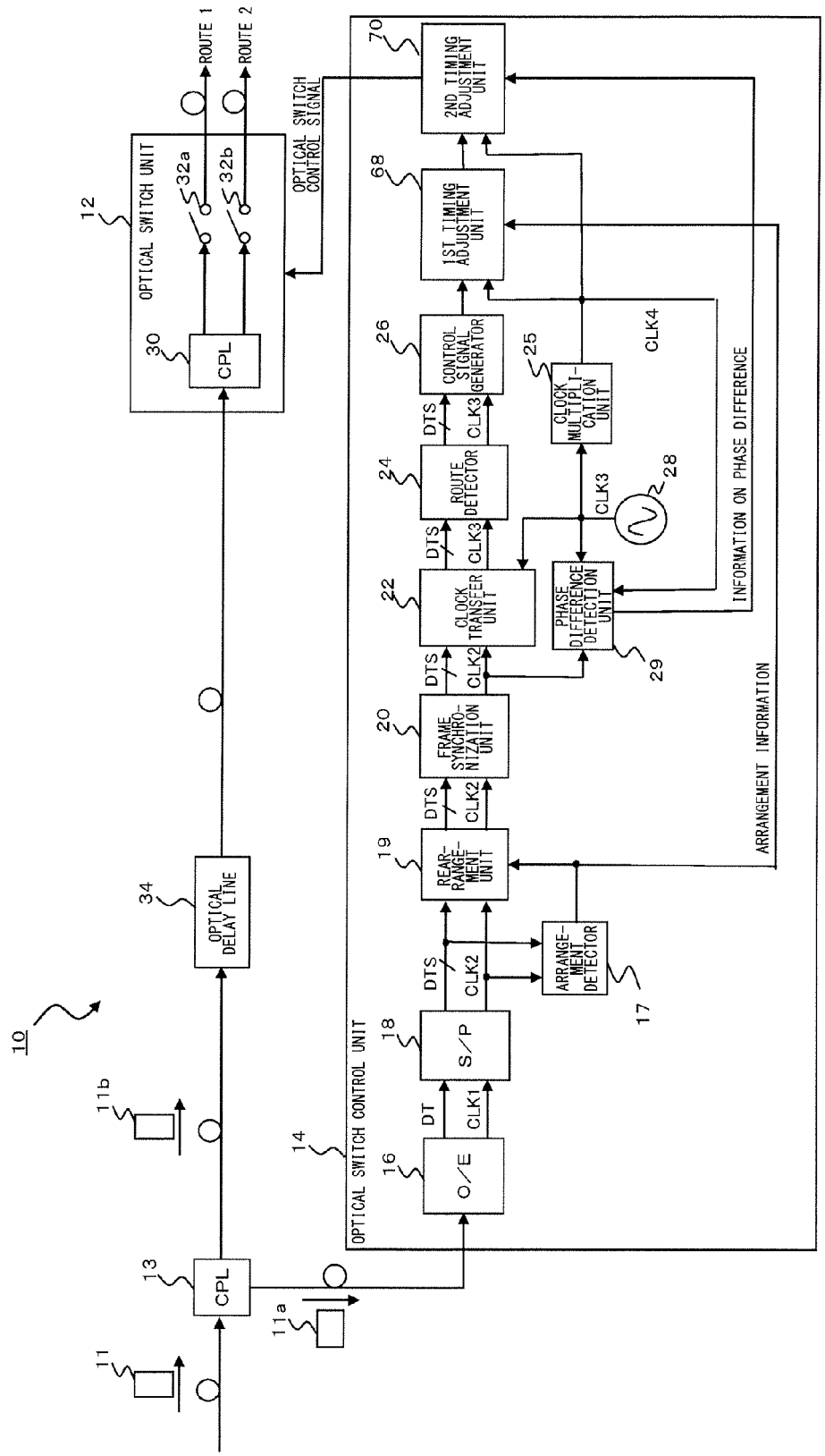
FIG. 17 is a diagram for explaining an optical packet switching apparatus according to a third embodiment of the present invention.

FIG. 17 is a diagram for explaining an optical packet switching apparatus 10 according to a third embodiment of the present invention. Components of the optical packet switching apparatus 10 according to the third embodiment which are identical to or correspond to those of the optical packet switching apparatus 10 according to the first embodiment shown in FIG. 7 are given the same reference numerals herein and the repeated description thereof are omitted as appropriate.

The optical packet switching apparatus 10 according to the third embodiment is configured such that the first embodiment shown in FIG. 7 and the second embodiment shown in FIG. 10 are combined together. The optical packet switching apparatus 10 according to the third embodiment includes two timing adjustment units, namely a first timing adjustment unit 68 and a second timing adjustment unit 70.

As shown in FIG. 17, the arrangement information, on the arrangement of the frame synchronization patterns, fed from the arrangement detector 17 is inputted to the first timing adjustment unit 68. Also, the phase difference information fed from the phase difference detection unit 29 is inputted to the second timing adjustment unit 70. Also, the multiplication clock CLK4 is inputted to the first timing adjustment unit 68 and the second timing adjustment unit 70 from the clock multiplication unit 25.

In the third embodiment, the optical switch control signal generated by the control signal generator 26 is first inputted to the first timing adjustment unit 68. The first timing adjustment unit 68 adjusts the output timing of the optical switch control signal, based on the information on the arrangement of the frame synchronization patterns. The method for adjusting the output timing thereof is similar to the method employed in the optical packet switching apparatus according to the first embodiment. The optical switch control signal which has been adjusted by the first timing adjustment unit 68 is then outputted to the second timing adjustment unit 70. The second timing adjustment unit 70 further adjusts the output timing of the optical switch control signal, based on the phase difference between the frequency-divided clock signal CLK2 and the local clock signal CLK3. The method for adjusting the output timing thereof is similar to the method employed in the optical packet switching apparatus according to the second embodiment. The optical switch control signal which has been adjusted by the second timing adjustment unit 70 is outputted to the optical switch unit 12.

By employing the optical packet switching apparatus 10 according to the third embodiment, the output timing of the optical switch control signal is adjusted using the phase difference information supplied from the phase difference detection unit 29 in addition to the arrangement information supplied from the arrangement detector 17. Thereby, the optical switch control signal can be outputted to the optical switch unit 12 with the timing which is more suitable than the above-described first and second embodiments. As a result, the optical switch on-time can be further shortened and therefore the bandwidth usage efficiency of the transmission path can be further improved.

The present invention has been described based upon illustrative embodiments. The above-described embodiments are intended to be illustrative only and it will be obvious to those skilled in the art that various modifications to the combination of constituting elements and processes could be further developed and that such modifications are also within the scope of the present invention.

The above-described conversion ratios in the serial/parallel conversion and the multiplication ratio in the multiplication clock are only exemplary and should not be considered as limiting. The higher the multiplication ratio is raised, the higher the resolution of on/off timing of the optical switch will be raised accordingly.

What is claimed is:

1. An optical packet switching apparatus comprising:
a branching unit configured to branch off a received optical packet signal;
an optical switch unit configured to switch a route of one of the branched-off optical packet signal so as to output the optical packet signal; and
an optical switch control unit configured to extract routing information from an other of the branched-off optical packet signal and configured to control the optical switching unit according to the extracted routing information,
the optical switch control unit including:
an optical-to-electrical (O/E) converter configured to convert the other of the branched-off optical packet signal into an electrical data signal and configured to extract a clock signal from the electrical data signal;
a serial/parallel converter configured to perform a serial/parallel conversion of the electrical data signal into a parallel data signal and configured to divide the frequency of the clock signal so as to generate a divided clock signal;
an arrangement detector configured to detect an arrangement of a frame synchronization pattern contained in the parallel data;
a rearrangement unit configured to rearrange the parallel data signal based on detected arrangement information on the frame synchronization pattern;
a frame synchronization unit configured to establish frame synchronization based on the frame synchronization pattern contained in the rearranged parallel data signal;
a route detector configured to detect routing information contained in the rearranged parallel data signal after the frame synchronization has been established;
a generator configured to generate an optical switch control signal used to control the optical switch unit based on the detected routing information; and
an adjustment unit configured to adjust output timing with which to output the optical switch control signal to the optical switch unit, based on the arrangement information on the frame synchronization pattern.

2. The optical packet switching apparatus according to claim 1, wherein the adjustment unit generates a plurality of optical switch control signals whose output timings differ, and configured to select one from among the plurality of optical switch control signals, based on the arrangement information on the frame synchronization pattern.

3. The optical packet switching apparatus according to claim 2, wherein the optical switch control unit generates the plurality of optical switch control signals, using a multiplication clock signal in which a local clock signal fed from a local oscillator is multiplied.

4. The optical packet switching apparatus according to claim 1, the optical switch control unit further including:
a local oscillator configured to oscillate a local clock signal;
a clock transfer unit configured to perform a transfer from the parallel data signal synchronized with the divided clock signal, to the local clock signal;
a phase difference detector configured to detect a phase difference between the divided clock signal and the local clock signal; and a second adjustment unit configured to adjust the output timing of the optical switch control signal, based on information on the phase difference.

5. The optical packet switching apparatus according to claim 4, the phase difference detector including:
   a first edge detector for performing differential edge detection on a rising edge or falling edge of the divided clock signal;
   a second edge detector for performing differential edge detection on a rising edge or falling edge of the local clock signal; and
   a phase difference determining unit for determining a difference in phase between an output pulse from the first edge detector and that from the second edge detector.

6. The optical packet switching apparatus according to claim 4, the phase difference detector including:
   a first exclusive-OR computing unit for computing exclusive-OR of the divided clock signal and the local clock signal;
   a second exclusive-OR computing unit for computing exclusive-OR of a clock signal, which lags one of the divided clock signal and the local clock signal by the phase of 90 degrees, and an other of the clock signals; and
   a phase difference determining unit for determining a difference in phase between the divided clock signal and the local clock signal, based on duty ratios of an output from the first exclusive-OR computing unit and an output from the second exclusive-OR computing unit.

7. The optical packet switching apparatus according to claim 4, the phase difference detector including:
   a first logical AND computing unit for computing logical AND of the divided clock signal and the local clock signal;
   a second logical AND computing unit for computing logical AND of a clock signal, which lags one of the divided clock signal and the local clock signal by the phase of 90 degrees, and the other of the clock signals; and
   a phase difference determining unit for determining a difference in phase between the divided clock signal and the local clock signal, based on duty ratios of an output from the first logical AND computing unit and an output from the second logical AND computing unit.

8. The optical packet switching apparatus according to claim 4, the phase difference detector including:
   a first logical OR computing unit for computing logical OR of the divided clock signal and the local clock signal;
   a second logical OR computing unit for computing logical OR of a clock signal, which lags one of the divided clock signal and the local clock signal by the phase of 90 degrees, and an other of the clock signals; and
   a phase difference determining unit for determining a difference in phase between the divided clock signal and the local clock signal, based on duty ratios of an output from the first logical OR computing unit and an output from the second logical OR computing unit.

9. An optical packet switching apparatus comprising:
   a branching unit configured to branch off a received optical packet signal;
   an optical switch unit configured to switch a route of one of the branched-off optical packet signal so as to output the optical packet signal; and
   an optical switch control unit configured to extract routing information from an other of the branched-off optical packet signal and configured to control the optical switching unit according to the extracted routing information,
   the optical switch control unit including:
      an optical-to-electrical (O/E) converter configured to convert the other of the branched off optical packet signal into an electrical data signal and configured to extract a clock signal from the electrical data signal;
      a serial/parallel converter configured to perform a serial/parallel conversion of the electrical data signal into a parallel data signal and configured to divide the frequency of the clock signal so as to generate a divided clock signal;
      a local oscillator configured to oscillate a local clock signal;
      a clock transfer unit configured to perform a transfer from the parallel data signal synchronized with the divided clock signal, to the local clock signal;
      a route detector configured to detect the routing information contained in the parallel data signal;
      a generator configured to generate an optical switch control signal used to control the optical switch unit based on the detected routing information;
      a phase difference detector configured to detect a phase difference between the divided clock signal and the local clock signal; and
      an adjustment unit configured to adjust output timing of the optical switch control signal, based on information on the phase difference fed from the phase difference detector.

10. The optical packet switching apparatus according to claim 9, wherein the adjustment unit generates a plurality of optical switch control signals whose output timings differ, and configured to select one from among the plurality of optical switch control signals, based on the phase difference information.

11. The optical packet switching apparatus according to claim 10, the optical switch control unit further including a clock multiplication unit configured to multiply the local clock signal,
   wherein the adjustment unit generates the plurality of optical switch control signals, using a multiplication clock signal supplied from the clock multiplication unit.

12. The optical packet switching apparatus according to claim 9, the phase difference detector including:
   a first edge detector for performing differential edge detection on a rising edge or falling edge of the divided clock signal;
   a second edge detector for performing differential edge detection on a rising edge or falling edge of the local clock signal; and
   a phase difference determining unit for determining a difference in phase between an output pulse from the first edge detector and that from the second edge detector.

13. The optical packet switching apparatus according to claim 9, the phase difference detector including:
   a first exclusive-OR computing unit for computing exclusive-OR of the divided clock signal and the local clock signal;
   a second exclusive-OR computing unit for computing exclusive-OR of a clock signal, which lags one of the divided clock signal and the local clock signal by the phase of 90 degrees, and an other of the clock signals; and
   a phase difference determining unit for determining a difference in phase between the divided clock signal and the local clock signal, based on duty ratios of an output from the first exclusive-OR computing unit and an output from the second exclusive-OR computing unit.

14. The optical packet switching apparatus according to claim 9, the phase difference detector including:
- a first logical AND computing unit for computing logical AND of the divided clock signal and the local clock signal;
- a second logical AND computing unit for computing logical AND of a clock signal, which lags one of the divided clock signal and the local clock signal by the phase of 90 degrees, and the other of the clock signals; and
- a phase difference determining unit for determining a difference in phase between the divided clock signal and the local clock signal, based on duty ratios of an output from the first logical AND computing unit and an output from the second logical AND computing unit.

15. The optical packet switching apparatus according to claim 9, the phase difference detector including:
- a first logical OR computing unit for computing logical OR of the divided clock signal and the local clock signal;
- a second logical OR computing unit for computing logical OR of a clock signal, which lags one of the divided clock signal and the local clock signal by the phase of 90 degrees, and an other of the clock signals; and
- a phase difference determining unit for determining a difference in phase between the divided clock signal and the local clock signal, based on duty ratios of an output from the first logical OR computing unit and an output from the second logical OR computing unit.

* * * * *